(12) United States Patent
Luo et al.

(10) Patent No.: US 11,035,948 B2
(45) Date of Patent: Jun. 15, 2021

(54) VIRTUAL REALITY FEEDBACK DEVICE, AND POSITIONING METHOD, FEEDBACK METHOD AND POSITIONING SYSTEM THEREOF

(71) Applicants: BOE Technology Group Co., Ltd., Beijing (CN); Hefei BOE Optoelectronics Technology Co., Ltd., Hefei (CN)

(72) Inventors: Hui Luo, Beijing (CN); Hui Wang, Beijing (CN); Xin Yi, Beijing (CN); Yanni Liu, Beijing (CN)

(73) Assignees: BOE Technology Group Co., Ltd., Beijing (CN); Hefei BOE Optoelectronics Technology Co., Ltd., Hefei (CN)

( * ) Notice: Subject to any disclaimer, the term of this patent is extended or adjusted under 35 U.S.C. 154(b) by 349 days.

(21) Appl. No.: 16/159,123

(22) Filed: Oct. 12, 2018

(65) Prior Publication Data
US 2019/0293779 A1 Sep. 26, 2019

(30) Foreign Application Priority Data
Mar. 20, 2018 (CN) .......................... 201810228984.7

(51) Int. Cl.
  *G01S 13/76* (2006.01)
  *G01S 13/00* (2006.01)
  *G01S 13/88* (2006.01)

(52) U.S. Cl.
  CPC .......... *G01S 13/765* (2013.01); *G01S 13/003* (2013.01); *G01S 13/88* (2013.01)

(58) Field of Classification Search
  CPC ....... G01S 13/765; G01S 13/003; G01S 13/88
  (Continued)

(56) References Cited

U.S. PATENT DOCUMENTS

| | | | |
|---|---|---|---|
| 6,380,952 B1 * | 4/2002 | Mass | G06T 19/003 715/757 |
| 7,487,045 B1 * | 2/2009 | Vieira | A63B 24/0021 702/181 |

(Continued)

FOREIGN PATENT DOCUMENTS

| | | |
|---|---|---|
| CN | 1937843 A | 3/2007 |
| CN | 101210964 A | 7/2008 |

(Continued)

OTHER PUBLICATIONS

Office Action for corresponding Chinese application 201810228984.7 dated Aug. 19, 2020.

*Primary Examiner* — Vladimir Magloire
*Assistant Examiner* — Nuzhat Pervin
(74) *Attorney, Agent, or Firm* — Arent Fox LLP; Michael Fainberg

(57) ABSTRACT

The disclosure discloses a virtual reality feedback device, and a positioning method, a feedback method, and a positioning system thereof. The method for positioning a virtual reality feedback device includes: obtaining first time point information of a first microwave signal, wherein the first time point information includes a reception time point and a transmission time point of the first microwave signal; obtaining a second time point information of a second microwave signal, wherein the second time point information includes a reception time point and a transmission time point of the second microwave signal; and determining a position of the virtual reality feedback device according to a transmission speed of the first microwave signal, a transmission speed of the second microwave signal, the first time point information, and the second time point information.

16 Claims, 6 Drawing Sheets

(58) Field of Classification Search
USPC .......................................................... 342/125
See application file for complete search history.

(56) References Cited

U.S. PATENT DOCUMENTS

| | | | | |
|---|---|---|---|---|
| 7,696,992 B2* | 4/2010 | Gyorfi | ..................... | A63F 13/30 |
| | | | | 345/419 |
| 10,008,875 B1* | 6/2018 | Leabman | ............ | H02J 7/00034 |
| 10,423,241 B1* | 9/2019 | Pham | ................. | G02B 27/0093 |
| 10,746,854 B1* | 8/2020 | Moore | ............... | G02B 27/0093 |
| 2004/0104935 A1* | 6/2004 | Williamson | ............ | G06T 15/20 |
| | | | | 715/757 |
| 2006/0222218 A1* | 10/2006 | Karaki | ................. | G06K 9/0002 |
| | | | | 382/124 |
| 2010/0220551 A1* | 9/2010 | Akiyama | ................ | G01S 7/539 |
| | | | | 367/99 |
| 2014/0085127 A1* | 3/2014 | Kishigami | ............ | G01S 13/284 |
| | | | | 342/108 |
| 2015/0061921 A1* | 3/2015 | Ding | ..................... | G01S 13/003 |
| | | | | 342/140 |
| 2016/0044766 A1* | 2/2016 | Alexander | ............. | H05B 45/10 |
| | | | | 315/291 |
| 2016/0225188 A1* | 8/2016 | Ruddell | ................... | G06F 3/011 |
| 2017/0085112 A1* | 3/2017 | Leabman | .............. | H02J 50/402 |
| 2018/0074600 A1* | 3/2018 | Park | ........................ | G01S 13/88 |
| 2018/0156914 A1* | 6/2018 | Tuxen | .................... | A63B 69/36 |
| 2018/0217246 A1* | 8/2018 | Zhang | ....................... | G01S 5/16 |
| 2018/0270783 A1* | 9/2018 | Venkatraman | ........ | G01S 5/0263 |

FOREIGN PATENT DOCUMENTS

| | | | | |
|---|---|---|---|---|
| CN | 102323578 A | * | 1/2012 | ............ G01S 13/08 |
| CN | 102323578 A | | 1/2012 | |
| CN | 105430744 A | | 3/2016 | |
| CN | 107347209 A | | 11/2017 | |
| CN | 107390878 A | | 11/2017 | |
| WO | WO-2018004412 A1 | * | 1/2018 | ........ H04W 28/0284 |

* cited by examiner

VIRTUAL REALITY FEEDBACK DEVICE, AND POSITIONING METHOD, FEEDBACK METHOD AND POSITIONING SYSTEM THEREOF

CROSS-REFERENCE TO RELATED APPLICATION

This Application claims priority to Chinese Patent Application No. 201810228984.7, filed on Mar. 20, 2018, the content of which is incorporated by reference in the entirety.

TECHNICAL FIELD

This disclosure relates to the field of virtual reality technologies, and particularly to a virtual reality feedback device, and a positioning method, a feedback method and a positioning system thereof.

DESCRIPTION OF THE RELATED ART

As virtual reality refers, a realistic virtual environment integrating visual, aural, tactile, olfactory, gustatory, and other senses are generated using modern high-technologies centered on computer technologies so that a user interacts naturally with an object in a virtual world from his or her perspective using special input and output devices to thereby both affect the object and be affected by the object. Virtual reality is not only a presentation medium but also a design tool. It reflects the idea of a designer visually, and for example, before a house is decorated, firstly the layout and appearance of the house are designed in details; and furthermore in order to quantify the design, a large number of drawings are further plotted. Of course, these drawings can only be interpreted by those skilled in the art, so the idea can be turned into a visible environment and visible objects using the virtual reality technology so that the traditional design paradigm can be changed into a perfect what-you-see-what-you-get digital environment to thereby greatly improve the quality and efficiency of designing and planning. In recent years, virtual reality has been widely applied in the field of games and entertainments, thus resulting in a significantly extended application market of head-mounted display devices.

Furthermore, a head-mounted display device magnifies an image on an ultra-micro display screen using a set of optical systems (generally including precision optical lenses), and projects the image onto retinas of a viewer, so that the image is presented on a large screen in eyes of the viewer. In order to improve immersion in virtual reality, the head-mounted display device in the related art is combined with a software component to thereby display different images matching with the orientation of the user, so the head-mounted display device shall provide additional positional information.

SUMMARY

Embodiments of the disclosure provide a virtual reality feedback device, and a positioning method, a feedback method and a positioning system thereof.

In one aspect, the embodiments of the disclosure provide a method for positioning a virtual reality feedback device, the method including: obtaining first time point information of a first microwave signal; wherein the first time point information includes a reception time point of the first microwave signal and a transmission time point of the first microwave signal; the first microwave signal is a microwave signal transmitted by the virtual reality feedback device and received by at least three position detection devices, or the first microwave signal is a microwave signal transmitted by at least three position detection devices and received by the virtual reality feedback device; obtaining second time point information of a second microwave signal; wherein the second time point information includes a reception time point of the second microwave signal and a transmission time point of the second microwave signal; the second microwave signal is a microwave signal transmitted and received by the at least three position detection devices, and a position detection device transmitting the second microwave signal is different from a position detection device receiving the second microwave signal; and determining a position of the virtual reality feedback device according to a transmission speed of the first microwave signal, a transmission speed of the second microwave signal, the first time point information and the second time point information; wherein at least two adjacent position detection devices of the at least three position detection devices are arranged along an X-axis direction, and at least two adjacent position detection devices of the at least three position detection devices are arranged along a Y-axis direction; and an X-axis is perpendicular to a Y-axis.

In some embodiments, in the method above for positioning the virtual reality feedback device according to the embodiments of the disclosure, each of the at least three position detection devices extends along a Z-axis direction and includes a plurality of sub-detectors arranged along the Z-axis direction, and each of the at least three position detection devices transmits the first microwave signal and/or the second microwave signal using the plurality of sub-detectors, wherein a Z-axis is perpendicular respectively to the X-axis and the Y-axis.

In some embodiments, in the method above for positioning the virtual reality feedback device according to the embodiments of the disclosure, the first microwave signal includes a microwave signal received or transmitted by a plurality of sub-detectors in any one of the at least three position detection devices; and determining the position of the virtual reality feedback device according to the transmission speed of the first microwave signal, the transmission speed of the second microwave signal, the first time point information and the second time point information includes: determining a coordinate of the virtual reality feedback device in the Z-axis direction according to the first time point information; determining a coordinate of the virtual reality feedback device in the X-axis direction according to obtained first time point information of the first microwave signal corresponding to position detection devices arranged along the Y-axis direction, obtained second time point information of the second microwave signal corresponding to the position detection devices arranged along the Y-axis direction, the transmission speed of the first microwave signal and the transmission speed of the second microwave signal; and determining a coordinate of the virtual reality feedback device in the Y-axis direction according to obtained first time point information of the first microwave signal corresponding to position detection devices arranged along the X-axis direction, obtained second time point information of the second microwave signal corresponding to the position detection devices arranged along the X-axis direction, the transmission speed of the first microwave signal and the transmission speed of the second microwave signal.

In some embodiments, in the method above for positioning the virtual reality feedback device according to the embodiments of the disclosure, determining the coordinate of the virtual reality feedback device in the Z-axis direction according to the first time point information includes: determining differences in time point between reception time points and transmission time points, corresponding to respective sub-detectors in any one of the at least three position detection device according to obtained reception time points and transmission time points of the first microwave signal, corresponding to the respective sub-detectors; determining a sub-detector corresponding to a smallest one of the differences in time point; and determining a coordinate of the sub-detector corresponding to the smallest one of the differences in time point in the Z-axis direction as the coordinate of the virtual reality feedback device in the Z-axis direction.

In some embodiments, in the method above for positioning the virtual reality feedback device according to the embodiments of the disclosure, determining the coordinate of the virtual reality feedback device in the X-axis direction according to the obtained first time point information of the first microwave signal corresponding to the position detection devices arranged along the Y-axis direction, the obtained second time point information of the second microwave signal corresponding to the position detection devices arranged along the Y-axis direction, the transmission speed of the first microwave signal and the transmission speed of the second microwave signal includes: determining distances between the virtual reality feedback device, and such sub-detectors in the position detection devices arranged along the Y-axis direction that have same coordinate in the Z-axis direction as the virtual reality feedback device, according to obtained first time point information of the first microwave signal corresponding to the sub-detectors, and the transmission speed of the first microwave signal; determining a distance between the sub-detectors in the position detection devices arranged along the Y-axis direction that have the same coordinate in the Z-axis direction as the virtual reality feedback device, according to obtained second time point information of the second microwave signal corresponding to the sub-detectors, and the transmission speed of the second microwave signal; and determining the coordinate of the virtual reality feedback device in the X-axis direction according to the distances between the virtual reality feedback device and the sub-detectors, and the distance between the sub-detectors.

In some embodiments, in the method above for positioning the virtual reality feedback device according to the embodiments of the disclosure, the coordinate of the virtual reality feedback device in the X-axis direction is determined in an equation of:

$$X_0 = \frac{2\sqrt{p(p - v_1 t_{y10})(p - v_1 t_{y20})(p - v_2 t_{y12})}}{v_2 t_{y12}}, \text{wherein}$$

$$P = \frac{v_1 t_{y10} + v_1 t_{y20} + v_2 t_{y12}}{2};$$

wherein $v_1$ represents the transmission speed of the first microwave signal, $v_2$ represents the transmission speed of the second microwave signal, $t_{y12}$ represents a difference in time between a reception time point and a transmission time point of the second microwave signal corresponding to two sub-detectors at same coordinate in the Z-axis direction as the virtual reality feedback device, in the position detection devices arranged along the Y-axis direction; and $t_{y10}$ and $t_{y20}$ represent differences in time between reception time points and transmission time points of the first microwave signal corresponding to the two sub-detectors at the same coordinate in the Z-axis direction as the virtual reality feedback device, in the position detection devices arranged along the Y-axis direction.

In some embodiments, in the method above for positioning the virtual reality feedback device according to the embodiments of the disclosure, determining the coordinate of the virtual reality feedback device in the Y-axis direction according to the obtained first time point information of the first microwave signal corresponding to the position detection devices arranged along the X-axis direction, the obtained second time point information of the second microwave signal corresponding to the position detection devices arranged along the X-axis direction, the transmission speed of the first microwave signal and the transmission speed of the second microwave signal includes: determining distances between the virtual reality feedback device, and such sub-detectors in the position detection devices arranged along the X-axis direction that have same coordinate in the Z-axis direction as the virtual reality feedback device, according to obtained first time point information of the first microwave signal corresponding to the sub-detectors, and the transmission speed of the first microwave signal; determining a distance between the sub-detectors in the position detection devices arranged along the X-axis direction that have the same coordinate in the Z-axis direction as the virtual reality feedback device, according to obtained second time point information of the second microwave signal corresponding to the sub-detectors, and the transmission speed of the second microwave signal; and determining the coordinate of the virtual reality feedback device in the Y-axis direction according to the distances between the virtual reality feedback device and the sub-detectors, and the distance between the sub-detectors.

In some embodiments, in the method above for positioning the virtual reality feedback device according to the embodiments of the disclosure, the coordinate of the virtual reality feedback device in the Y-axis direction is determined in an equation of:

$$Y_0 = \frac{2\sqrt{q(q - v_1 t_{x10})(q - v_1 t_{x20})(q - v_2 t_{x12})}}{v_2 t_{x12}},$$

wherein $$P = \frac{v_1 t_{x10} + v_1 t_{x20} + v_2 t_{x12}}{2};$$

$v_1$ represents the transmission speed of the first microwave signal, $v_2$ represents the transmission speed of the second microwave signal, $t_{x12}$ represents a difference in time between a reception time point and a transmission time point of the second microwave signal corresponding to two sub-detectors at same coordinate in the Z-axis direction as the virtual reality feedback device, in the position detection devices arranged along the X-axis direction; and $t_{x10}$ and $t_{x20}$ represent differences in time between reception time points and transmission time points of the first microwave signal corresponding to the two sub-detectors at the same coordinate in the Z-axis direction as the virtual reality feedback device, in the position detection devices arranged along the X-axis direction.

In some embodiments, in the method above for positioning the virtual reality feedback device according to the embodiments of the disclosure, each microwave signal includes an identifier for identifying such a sub-detector in a position detection device that transmits the microwave signal.

In some embodiments, in the method above for positioning the virtual reality feedback device according to the embodiments of the disclosure, after the position of the virtual reality feedback device is determined, the method further includes: determining positions of the virtual reality feedback device at different instances of time; and determining a displacement of the virtual reality feedback device according to the positions of the virtual reality feedback device at the different instances of time.

In another aspect, the embodiments of the disclosure further provide a feedback method of the virtual reality feedback device, the method including: determining the position of the virtual reality feedback device using the method above for positioning the virtual reality feedback device according to the embodiments of the disclosure; and determining feedback information corresponding to the position of the virtual reality feedback device according to the position.

In some embodiments, in the feedback method above of the virtual reality feedback device according to the embodiments of the disclosure, the virtual reality feedback device is a wearable display device, and determining the feedback information corresponding to the position of the virtual reality feedback device according to the position includes: determining coordinates of the wearable display device in a corresponding virtual reality environment according to positional information of the wearable display device; and determining an image to be displayed on the wearable display device according to the coordinates of the wearable display device in the corresponding virtual reality environment.

In still another aspect, the embodiments of the disclosure further provides a system for positioning a virtual reality feedback device, the system including: at least three position detection devices configured to transmit and/or to receive a first microwave signal, and to transmit and receive a second microwave signal; wherein at least two adjacent position detection devices of the at least three position detection devices are arranged along an X-axis direction, and at least two adjacent position detection devices of the at least three position detection devices are arranged along a Y-axis direction; and an X-axis is perpendicular to a Y-axis; a memory configured to store computer readable program codes; and a processor configured to execute the computer readable program codes to: obtain first time point information of the first microwave signal; wherein the first time point information includes a reception time point of the first microwave signal and a transmission time point of the first microwave signal; the first microwave signal is a microwave signal transmitted by the virtual reality feedback device and received by the at least three position detection devices, or the first microwave signal is a microwave signal transmitted by the at least three position detection devices and received by the virtual reality feedback device; obtain second time point information of the second microwave signal; wherein the second time point information includes a reception time point of the second microwave signal and a transmission time point of the second microwave signal; the second microwave signal is a microwave signal transmitted and received by the at least three position detection devices, and a position detection device transmitting the second microwave signal is different from a position detection device receiving the second microwave signal; and determine a position of the virtual reality feedback device according to a transmission speed of the first microwave signal, a transmission speed of the second microwave signal, the first time point information and the second time point information.

In some embodiments, in the system above for positioning the virtual reality feedback device according to the embodiments of the disclosure, each of the at least three position detection devices extends along a Z-axis direction and includes a plurality of sub-detectors arranged along the Z-axis direction, and each of the at least three position detection devices transmits the first microwave signal and/or the second microwave signal using the plurality of sub-detectors, wherein a Z-axis is perpendicular respectively to the X-axis and the Y-axis.

In some embodiments, in the system above for positioning the virtual reality feedback device according to the embodiments of the disclosure, the first microwave signal includes a microwave signal received or transmitted by a plurality of sub-detectors in any one of the at least three position detection devices; and the processor is further configured to execute the computer readable program codes to: determine a coordinate of the virtual reality feedback device in the Z-axis direction according to the first time point information; determine a coordinate of the virtual reality feedback device in the X-axis direction according to obtained first time point information of the first microwave signal corresponding to position detection devices arranged along the Y-axis direction, obtained second time point information of the second microwave signal corresponding to the position detection devices arranged along the Y-axis direction, the transmission speed of the first microwave signal and the transmission speed of the second microwave signal; and determine a coordinate of the virtual reality feedback device in the Y-axis direction according to obtained first time point information of the first microwave signal corresponding to position detection devices arranged along the X-axis direction, obtained second time point information of the second microwave signal corresponding to the position detection devices arranged along the X-axis direction, the transmission speed of the first microwave signal and the transmission speed of the second microwave signal.

In some embodiments, in the system above for positioning the virtual reality feedback device according to the embodiments of the disclosure, the processor is further configured to execute the computer readable program codes to: determine differences in time point between reception time points and transmission time points, corresponding to respective sub-detectors in any one of the at least three position detection device according to obtained reception time points and transmission time points of the first microwave signal, corresponding to the respective sub-detectors; determine a sub-detector corresponding to a smallest one of the differences in time point; and determine a coordinate of the sub-detector corresponding to the smallest one of the differences in time point in the Z-axis direction as the coordinate of the virtual reality feedback device in the Z-axis direction.

In some embodiments, in the system above for positioning the virtual reality feedback device according to the embodiments of the disclosure, the processor is further configured to execute the computer readable program codes to: determine distances between the virtual reality feedback device, and such sub-detectors in the position detection devices arranged along the Y-axis direction that have same coordinate in the Z-axis direction as the virtual reality feedback device, according to obtained first time point information of the first microwave signal corresponding to the sub-detectors, and the transmission speed of the first microwave signal; determine a distance between the sub-detectors in the position detection devices arranged along the Y-axis direction that have the same coordinate in the Z-axis direction as the virtual reality feedback device, according to obtained second time point information of the second microwave signal corresponding to the sub-detectors, and the transmission speed of the second microwave signal; and determine the coordinate of the virtual reality feedback device in the X-axis direction according to the distances between the virtual reality feedback device and the sub-detectors, and the distance between the sub-detectors.

In some embodiments, in the system above for positioning the virtual reality feedback device according to the embodiments of the disclosure, the processor is further configured to execute the computer readable program codes to: determine distances between the virtual reality feedback device, and such sub-detectors in the position detection devices arranged along the X-axis direction that have same coordinate in the Z-axis direction as the virtual reality feedback device, according to obtained first time point information of the first microwave signal corresponding to the sub-detectors, and the transmission speed of the first microwave signal; determine a distance between the sub-detectors in the position detection devices arranged along the X-axis direction that have the same coordinate in the Z-axis direction as the virtual reality feedback device, according to obtained second time point information of the second microwave signal corresponding to the sub-detectors, and the transmission speed of the second microwave signal; and determine the coordinate of the virtual reality feedback device in the Y-axis direction according to the distances between the virtual reality feedback device and the sub-detectors, and the distance between the sub-detectors.

In a yet aspect, the embodiments of the disclosure further provide a virtual reality feedback device; wherein the virtual reality feedback device is positioned using the method above for positioning the virtual reality feedback device according to the embodiments of the disclosure.

In yet another aspect, the embodiments of the disclosure further provide a virtual reality feedback device; wherein the virtual reality feedback device performs feedback using the feedback method above of the virtual reality feedback device according to the embodiments of the disclosure, based on the position of the virtual reality feedback device.

BRIEF DESCRIPTION OF THE DRAWINGS

In order to make the technical solutions according to the embodiments of the disclosure more apparent, the drawings to which a description of the embodiments refers will be briefly introduced below, and apparently the drawings to be described below are merely illustrative of some of the embodiments of the disclosure, and those ordinarily skilled in the art can derive from these drawings other drawings without any inventive effort.

DETAILED DESCRIPTION OF THE EMBODIMENTS

Figure 1:
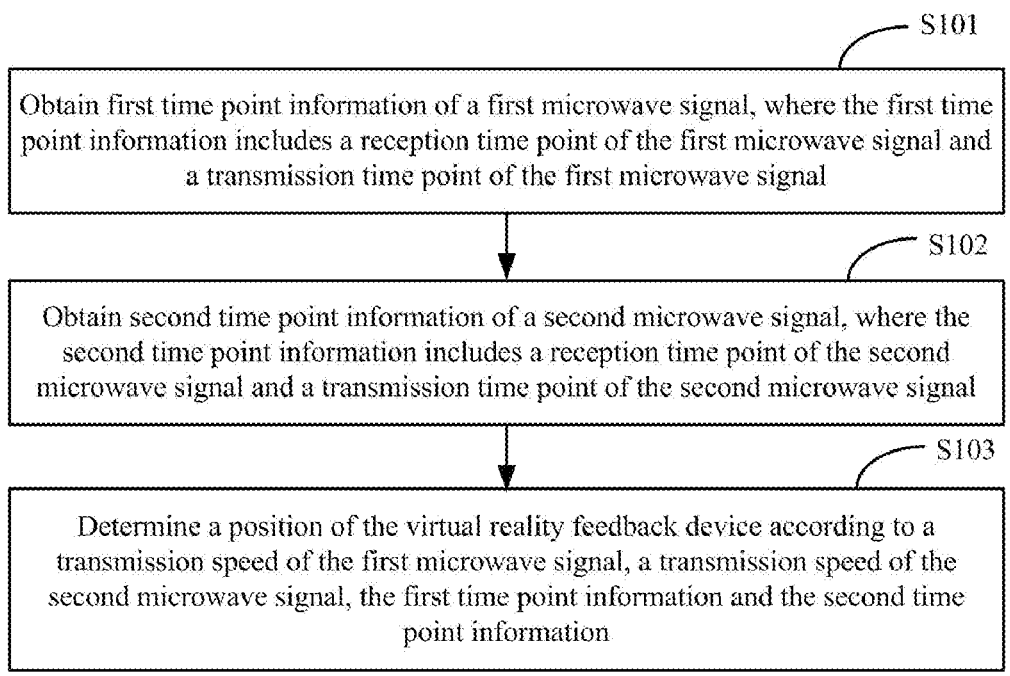
FIG. 1 is a schematic flow chart of a method for positioning a virtual reality feedback device according to the embodiments of the disclosure.

In order to make the objects, features, and advantages of the disclosure more apparent and readily understood, the disclosure will be described below in further details with reference to the drawings and the embodiments thereof. However the exemplary embodiments can be implemented in a number of forms, but shall not be construed as being limited to the embodiments described here; and on the contrary, these embodiments are provided to make the disclosure of the disclosure more full and complete, and to completely convey the idea of the embodiments to those skilled in the art. Like reference numerals in the drawings refer to identical or like structures, so a repeated description thereof will be omitted. All the terms as described in the disclosure to represent positions and directions will be described by way of an example with reference to the drawings, but can also be varied as needed without departing from the scope of the disclosure as claimed.

It shall be noted that particular details will be set forth in the following description to facilitate full understanding of the disclosure. However the disclosure can be embodied in a number of other embodiments than those described here, and those skilled in the art can generalize them without departing from the spirit of the disclosure. Accordingly the disclosure will not be limited to the particular embodiments to be disclosed below. For example, some words may be used in the description and the claims to refer to specific components. Those skilled in the art shall appreciate that hardware manufacturers may denominate the same component using different names. In the description and the claims, the components will not be distinguished using their different names, but will be distinguished using their different functions. For example, "include" or "comprise" or a variant thereof as referred to throughout the description and the claims is an open term, and thus shall be construed as "include but will not be limited to". Preferred embodiments of the disclosure will be described below merely for the purpose of setting forth the general principle of the disclosure, but not for limiting the scope of the disclosure thereto. The scope of the disclosure as claimed shall be as defined in the appended claims.

The embodiments of the disclosure provide a virtual reality feedback device, and a positioning method, a feedback method and a positioning system thereof so as to track the position of the virtual reality feedback device to thereby improve the experience of a user to some extent.

It shall be noted that, in the method for positioning the virtual reality feedback device and the feedback method of the virtual reality feedback device according to the embodiments of the disclosure, the methods are performed using a coordinate system defined by at least three position detection devices. In the embodiments of the disclosure, a position detection device can be any independent device capable of transmitting and receiving a microwave signal, e.g., a sensor, etc. The virtual reality feedback device in the embodiments of the disclosure can be any independent device to be positioned, and for example, the virtual reality feedback device is a wearable display device, etc., although the embodiments of the disclosure will not be limited thereto.

Referring to FIG. 1, a method for positioning a virtual reality feedback device according to the embodiments of the disclosure includes following operations.

The operation S101 is to obtain first time point information of a first microwave signal, where the first time point information includes a reception time point of the first microwave signal and a transmission time point of the first microwave signal; the first microwave signal is a microwave signal transmitted by the virtual reality feedback device and received by at least three position detection devices, or the first microwave signal is a microwave signal transmitted by at least three position detection devices and received by the virtual reality feedback device; and of the at least three position detection devices, there are at least two adjacent position detection devices arranged along an X-axis direction and at least two adjacent position detection devices arranged along a Y-axis direction, and an X-axis is perpendicular to a Y-axis.

Figure 2:
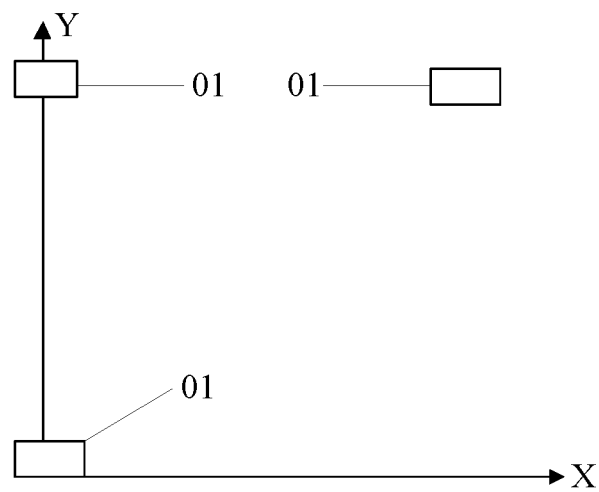
FIG. 2 is a schematic structural diagram of a positional relationship between position detection devices according to the embodiments of the disclosure.

It shall be noted that in the embodiments of the disclosure, in order to determine a position of the virtual reality feedback device in a coordinate system consisted of position detection devices, there are at least three position detection devices, and at least two adjacent position detection devices of the at least three position detection devices are arranged along the X-axis direction, and at least two adjacent position detection devices of the at least three position detection devices are arranged along the Y-axis direction, as illustrated in FIG. 2. Of course there may be four or more position detection devices for positioning the virtual reality feedback device. When there are three position detection devices for positioning the virtual reality feedback device, the three position detection devices are arranged as illustrated in FIG. 2. And in order to determine the position of the virtual reality feedback device precisely, in the embodiments of the disclosure, the three position detection devices are arranged to define an XY or XYZ coordinate system, and the position of the virtual reality feedback device is determined according to the coordinate system. Accordingly in the embodiments of the disclosure, in order to determine the position of the virtual reality feedback device using the position detection devices, the at least three position detection devices are arranged respectively in the X-axis and Y-axis directions, and the at least three position detection devices are arranged respectively around the virtual reality feedback device.

In some embodiments, in the embodiments of the disclosure, the first time point information is obtained in such a way that a position detection device or the virtual reality feedback device transmits the first time point information. For example, if the first microwave signal is a microwave signal transmitted by a position detection device, and received by the virtual reality feedback device, then the virtual reality feedback device will transmit the first time point information of the first microwave signal to a processor (the processor is an entity performing the method for positioning the virtual reality feedback device in the embodiments of the disclosure) upon reception of the first microwave signal, where the position detection device transmits the first microwave signal to the virtual reality feedback device by carrying at least the transmission time point of the first microwave signal, and the virtual reality feedback device determines an instance of time when the first microwave signal is received, as the reception time point of the first microwave signal. In another example, if the first microwave signal is a microwave signal transmitted by the virtual reality feedback device, and received by a position detection device, then the position detection device will transmit the first time point information of the first microwave signal to a processor (the processor is an entity performing the method for positioning a virtual reality feedback device in the embodiments of the disclosure) upon reception of the first microwave signal, where the virtual reality feedback device transmits the first microwave signal to the position detection device by carrying at least the transmission time point of the first microwave signal, and the position detection device determines an instance of time when the first microwave signal is received, as the reception time point of the first microwave signal.

The operation S102 is to obtain second time point information of a second microwave signal, where the second time point information includes a reception time point of the second microwave signal and a transmission time point of the second microwave signal, and the second microwave signal is a microwave signal transmitted and received by the at least three position detection devices, where a position detection device transmitting the second microwave signal is different from a position detection device receiving the second microwave signal.

It shall be noted that in the embodiments of the disclosure, the operation S101 and the operation S102 may not be performed in a fixed order, that is, firstly the operation S101 and then the operation S102 may be performed; or firstly the operation S102 and then the operation S101 may be performed, or the operation S101 and the operation S102 may be performed at the same time, although the embodiments of the disclosure will not be limited thereto.

In some embodiments, in the embodiments of the disclosure, the second time point information is obtained in such a way that a position detection device transmits the second time point information. For example, if a first position detection device in the Y-axis direction transmits the second microwave signal to a second position detection device in the Y-axis direction, then the first position detection device will transmit the transmission time point of the second microwave signal to the second position detection device when transmitting the second microwave signal, and the second position detection device will determine a reception time point at which the second microwave signal is received, and transmit the transmission time point and the reception time point of the second microwave signal to the processor (the processor is the entity performing the method for positioning the virtual reality feedback device).

The operation S103 is to determine a position of the virtual reality feedback device according to a transmission speed of the first microwave signal, a transmission speed of the second microwave signal, the first time point information and the second time point information.

It shall be noted that in the embodiments of the disclosure, the first microwave signal and the second microwave signal may be the same signal or may be different signals. In the embodiments of the disclosure, the transmission speed of the first microwave signal and the transmission speed of the second microwave signal may be the same or may be different. For example, if the first microwave signal and the second microwave signal are the same microwave signal, then the transmission speed of the first microwave signal and the transmission speed of the second microwave signal are the same; and if the first microwave signal and the second microwave signal are different microwave signals, then the transmission speed of the first microwave signal and the transmission speed of the second microwave signal may be the same or may be different, although the embodiments of the disclosure will not be limited thereto. Further, in the embodiments of the disclosure, the first microwave signal and the second microwave signal may be any microwave signal, and the first microwave signal and the second microwave signal are defined only for the purpose of distinguishing the microwave signals transmitted between different devices.

In the method above for positioning the virtual reality feedback device according to the embodiments of the disclosure, the first time point information of the first microwave signal, the second time point information of the second microwave signal, the transmission speed of the first microwave signal and the transmission speed of the second microwave signal are obtained, so that the position of the virtual reality feedback device is determined. In some embodiments, in the method above for positioning the virtual reality feedback device according to the embodiments of the disclosure, the method is generally applicable in such a way that the position of the virtual reality feedback device is determined according to a reception time point and a transmission time point of a second microwave signal transmitted between at least two adjacent position detection devices arranged along the Y-axis direction, a reception time point and a transmission time point of a second microwave signal transmitted between at least two adjacent position detection devices arranged along the X-axis direction, and a reception time point and a transmission time point of a first microwave signal transmitted between the virtual reality feedback device and at least three position detection devices, in a coordinate system consisted of the at least three position detection devices, so that the virtual reality feedback device can be tracked using the position detection devices through microwave transmission to thereby improve the experience of a user to some extent.

In some embodiments, in order to further determine the position of the virtual reality feedback device in a Z-axis direction, in the method above for positioning the virtual reality feedback device according to the embodiments of the disclosure, each position detection device extends along the Z-axis direction and includes a plurality of sub-detectors arranged along the Z-axis direction, and each position detection device transmits or receives the first microwave signal and/or the second microwave signal using the sub-detectors, where a Z-axis is perpendicular respectively to the X-axis and the Y-axis. Further, it shall be noted that, a sub-detector can be any device capable of transmitting and receiving a microwave signal, e.g., a sensor, etc.

Figure 3:
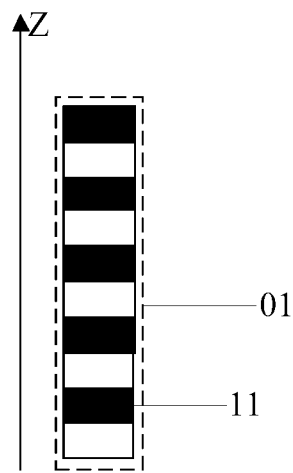
FIG. 3 is a schematic structural diagram of a position detection device according to the embodiments of the disclosure.

In some embodiments, if the virtual reality feedback device is moving in the space, then in order to determine the position of the virtual reality feedback device in the space precisely, positions of the virtual reality feedback device in the coordinate system defined by the X, Y, and Z axes will be determined, where the position of the virtual reality feedback device in the space can be determined by determining firstly a position of the virtual reality feedback device in the Z-axis direction, and then positions of the virtual reality feedback device in the X-axis and Y-axis directions. In the embodiments of the disclosure, each position detection device can be structured as illustrated in FIG. 3, where each position detection device includes a plurality of sub-detectors 11 arranged along the Z-axis direction, and each sub-detector 11 is configured to transmit the first microwave signal to the virtual reality feedback device, or receive the first microwave signal transmitted by the virtual reality feedback device; and each sub-detector is further configured to transmit the second microwave signal to a sub-detector in an adjacent position detection device, and to receive the second microwave signal transmitted by a sub-detector in an adjacent position detection device. Accordingly in the embodiments of the disclosure, each position detection device can transmit or receive the first microwave signal, and transmit or receive the second microwave signal, using corresponding sub-detectors.

In some embodiments, each position detection device includes a plurality of sub-detectors, and the virtual reality feedback device can transmit a microwave signal with the plurality of sub-detectors in each position detection device, so in order to further determine a shortest distance of the virtual reality feedback device from the X axis or the Y axis, firstly a coordinate of the virtual reality feedback device in the Z-axis direction can be determined, and then coordinates of the virtual reality feedback device in the X-axis and Y-axis directions on a plane on which the coordinate in the Z-axis direction lies, and which is perpendicular to the Z axis can be further determined.

In some embodiments, the first microwave signal includes a microwave signal received or transmitted by a plurality of sub-detectors in any one position detection device; and determining the position of the virtual reality feedback device according to the transmission speed of the first microwave signal, the transmission speed of the second microwave signal, the first time point information and the second time point information in the operation S103 includes: determining a coordinate of the virtual reality feedback device in the Z-axis direction according to the first time point information; determining a coordinate of the virtual reality feedback device in the X-axis direction according to obtained first time point information of the first microwave signal corresponding to position detection devices arranged along the Y-axis direction, obtained second time point information of the second microwave signal corresponding to the position detection devices arranged along the Y-axis direction, the transmission speed of the first microwave signal and the transmission speed of the second microwave signal; and determining a coordinate of the virtual reality feedback device in the Y-axis direction according to obtained first time point information of the first microwave signal corresponding to position detection devices arranged along the X-axis direction, obtained second time point information of the second microwave signal corresponding to the position detection devices arranged along the X-axis direction, the transmission speed of the first microwave signal and the transmission speed of the second microwave signal.

It shall be noted that in the embodiments of the disclosure, the first microwave signal corresponding to the position detection devices arranged along the Y-axis direction includes a first microwave signal received by the position detection devices arranged along the Y-axis direction and transmitted by the virtual reality feedback device, or a first microwave signal transmitted by the position detection devices arranged along the Y-axis direction and received by the virtual reality feedback device; the second microwave signal corresponding to the position detection devices arranged along the Y-axis direction includes a second microwave signal received and transmitted by the position detection devices arranged along the Y-axis direction, i.e. a second microwave signal transmitted between the position detection devices arranged along the Y-axis direction; the first microwave signal corresponding to the position detection devices arranged along the X-axis direction includes a first microwave signal received by the position detection devices arranged along the X-axis direction and transmitted by the virtual reality feedback device, or a first microwave signal transmitted by the position detection devices arranged along the X-axis direction and received by the virtual reality feedback device; and the second microwave signal corresponding to the position detection devices arranged along the X-axis direction includes a second microwave signal received and transmitted by the position detection devices arranged along the X-axis direction.

In some embodiments, in the method above for positioning the virtual reality feedback device according to the embodiments of the disclosure, determining the coordinate of the virtual reality feedback device in the Z-axis direction according to the first time point information includes: determining differences in time point between reception time points and transmission time points, corresponding to respective sub-detectors in any one position detection device according to obtained reception time points and transmission time points of the first microwave signal corresponding to the respective sub-detectors; determining a sub-detector corresponding to a smallest one of the differences in time point; and determining a coordinate of the sub-detector corresponding to the smallest one of the differences in time point in the Z-axis direction as the coordinate of the virtual reality feedback device in the Z-axis direction.

In some embodiments, in a preset periodicity, the plurality of sub-detectors in any one position detection device can transmit first microwave signals to the virtual reality feedback device respectively at the same time or in sequence at a fixed interval of time, and each sub-detector transmits a first microwave signal by carrying a transmission time point thereof. The virtual reality feedback device receives a plurality of first microwave signals, and transmits transmission time points and reception time points of the plurality of first microwave signals to the processor. The processor determines lengths of time for which respective first microwave signals are transmitted from the plurality of sub-detectors to the virtual reality feedback device (i.e., the differences in time point between the reception time points and the transmission time points) according to the transmission time points and the reception time points of the plurality of first microwave signals; and after the shortest one of the lengths of time for which the first microwave signals are transmitted from the plurality of sub-detectors to the virtual reality feedback device (i.e., the smallest difference in time point) is determined, the processor further determines a coordinate of a transmitter of a first microwave signal corresponding to the shortest length of time, i.e., a sub-detector transmitting the first microwave signal corresponding to the shortest length of time, in the Z-axis direction as the coordinate of the virtual reality feedback device in the Z-axis direction.

Alternatively the virtual reality feedback device transmits first microwave signals to respective sub-detectors at a preset periodicity, and the virtual reality feedback device transmits the first microwave signals by carrying transmission time points thereof. The plurality of sub-detectors in any one position detection device receive the first microwave signals, and transmit reception time points at which the first microwave signals are received and the transmission time points of the first microwave signals to the processor. The processor determines lengths of time for which respective first microwave signals are transmitted from the virtual reality feedback device to respective sub-detectors (i.e., the differences in time point between the reception time points and the transmission time points) according to the transmission time points and the reception time points of the respective first microwave signals, and after the shortest one of the lengths of time for which the respective first microwave signal are transmitted from the virtual reality feedback device to the respective sub-detectors (i.e., the smallest difference in time point) is determined, the processor further determines a coordinate of a receiver of a first microwave signal corresponding to the shortest length of time, i.e., a sub-detector receiving the first microwave signal corresponding to the shortest length of time, in the Z-axis direction as the coordinate of the virtual reality feedback device in the Z-axis direction.

It shall be noted that in the embodiments of the disclosure, the coordinate of the virtual reality feedback device in the Z-axis direction can alternatively be determined otherwise, although the embodiments of the disclosure will not be limited thereto. Furthermore if the virtual reality feedback device moves only on a plane defined by the X-axis and the Y-axis, then each position detection device may include only one sub-detector instead of a plurality of sub-detectors, and the only one sub-detector is configured to transmit and receive a microwave signal.

In some embodiments, in the method above for positioning the virtual reality feedback device according to the embodiments of the disclosure, determining the coordinate of the virtual reality feedback device in the X-axis direction according to the obtained first time point information of the first microwave signal corresponding to the position detection devices arranged along the Y-axis direction, the obtained second time point information of the second microwave signal corresponding to the position detection devices arranged along the Y-axis direction, the transmission speed of the first microwave signal and the transmission speed of the second microwave signal includes: determining distances between the virtual reality feedback device, and such sub-detectors in the position detection devices arranged along the Y-axis direction that have the same coordinate in the Z-axis direction as the virtual reality feedback device, according to obtained first time point information of the first microwave signal corresponding to the sub-detectors, and the transmission speed of the first microwave signal; determining a distance between the sub-detectors in the position detection devices arranged along the Y-axis direction that have the same coordinate in the Z-axis direction as the virtual reality feedback device, according to obtained second time point information of the second microwave signal corresponding to the sub-detectors, and the transmission speed of the second microwave signal; and determining the coordinate of the virtual reality feedback device in the X-axis direction according to the distances between the virtual reality feedback device and the sub-detectors, and the distance between the sub-detectors.

In some embodiments, after the coordinate of the virtual reality feedback device in the Z-axis direction is determined, the coordinates of the virtual reality feedback device in the X-axis direction and the Y-axis direction can be determined according to only first microwave signals transmitted and received by at least three sub-detectors at the same coordinate in the Z-axis direction as the virtual reality feedback device, first time point information of the first microwave signals, and second time point information of second microwave signals received by the at least three sub-detectors.

In some embodiments, the coordinate of the virtual reality feedback device in the X-axis direction is determined as follows: an area of a triangle defined by the virtual reality feedback device and two adjacent position detection devices arranged along the Y-axis direction is calculated in a Helen equation of a triangle, and then the coordinate of the virtual reality feedback device in the X-axis direction is determined as per a principle of "a height of a triangle solved using a known area and a known length of a bottom of the triangle".

Here an area of a triangle is solved in the Helen equation of a triangle as defined in Equation (1) below. For example, if there is such a triangle on a plane that has lengths of three sides thereof being a, b, and c respectively, then an area S of the triangle may be solved in an Equation (1) of:

$$S = \sqrt{p(p-a)(p-b)(p-c)}, \text{ where } p = \frac{a+b+c}{2}.$$

Figure 4:
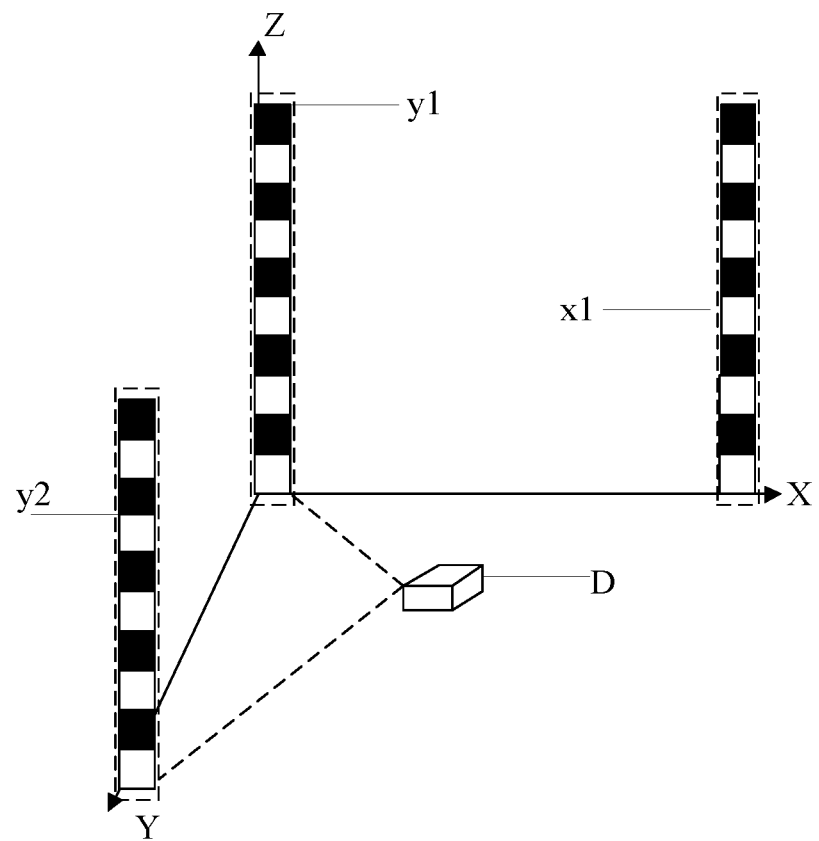
FIG. 4 is a schematic structural diagram of determining by a virtual reality feedback device a coordinate position in an X-axis direction in a coordinate system consisted of position detection devices according to the embodiments of the disclosure.

In some embodiments, if there are only three position detection devices, then the virtual reality feedback device D may be located in a coordinate system consisted of the three position detection devices as illustrated in FIG. 4, where a first position detection device y1 and a second position detection device y2 are arranged along the Y-axis direction, and a third position detection device x1 and the first position detection device y1 are arranged along the X-axis direction. And in order to determine the position of the virtual reality feedback device in the coordinate system more conveniently, an origin of the coordinate system can be set at will, and of course, the position of the virtual reality feedback device can be determined more easily if any position detection device is located at the origin, for example, the first position detection device y1 or the second position detection device y2 can be positioned at the origin of the coordinate system, where FIG. 4 merely illustrates the first position detection device y1 being positioned at the origin of the coordinate system by way of an example.

In order to further determine the coordinate of the virtual reality feedback device D in the X-axis direction, a first triangle defined by the virtual reality feedback device D, the first position detection device y1 and the second position detection device y2 can be used.

In the first operation, lengths of respective sides in the first triangle are determined respectively. Where firstly a distance between the virtual reality feedback device D and the first position detection device y1 is determined as a product of a length of time for the first microwave signal to be transmitted between the virtual reality feedback device D and the first position detection device y1, and the transmission speed of the first microwave signal; for example, the transmission speed of the first microwave signal is $v_1$, and the length of time for the first microwave signal to be transmitted from the virtual reality feedback device D to the first position detection device y1 is $t_{y10}=t_{y1}-t_0$, where $t_0$ represents the transmission time point of the first microwave signal, and $t_{y1}$ represents the reception time point of the first microwave signal, or the length of time for the first microwave signal to be transmitted from the first position detection device y1 to the virtual reality feedback device D is $t_{y10}=t_0-t_{y1}$, where $t_0$ represents the reception time point of the first microwave signal, and $t_{y1}$ represents the transmission time point of the first microwave signal. Then alike, a distance between the virtual reality feedback device D and the second position detection device y2 is determined as a product of a length of time for the first microwave signal to be transmitted between the virtual reality feedback device D and the second position detection device y2, and the transmission speed of the first microwave signal; for example, the transmission speed of the first microwave signal is $v_1$, and the length of time for the first microwave signal to be transmitted from the virtual reality feedback device D to the second position detection device y2 is $t_{y20}=t_{y2}-t_0$, where to represents the transmission time point of the first microwave signal, and $t_{y2}$ represents the reception time point of the first microwave signal, or the length of time for the first microwave signal to be transmitted from the second position detection device y2 to the virtual reality feedback device D is $t_{y20}=t_0-t_{y2}$, where $t_0$ represents the reception time point of the first microwave signal, and $t_{y2}$ represents the transmission time point of the first microwave signal. Next, a distance between the first position detection device y1 and the second position detection device y2 is determined as a product of a length of time for the second microwave signal to be transmitted between the first position detection device y1 and the second position detection device y2, and the transmission speed of the second microwave signal; for example, the transmission speed of the second microwave signal is $v_2$, and the length of time for the second microwave signal to be transmitted from the first position detection device y1 to the second position detection device y2 (or from the second position detection device y2 to the first position detection device y1) is $t_{y12}=t_{y1}-t_{y2}$, where $t_{y2}$ represents the transmission time point of the second microwave signal, and $t_{y1}$ represents the reception time point of the second microwave signal.

The second operation is to calculate an area of the first triangle in Equation (1) above. In some embodiments, the distance between the virtual reality feedback device D and the first position detection device y1, the distance between the virtual reality feedback device D and the second position detection device y2, and the distance between the first position detection device y1 and the second position detection device y2 in the first triangle determined in the first operation are substituted respectively into Equation (1) to calculate the area of the first triangle.

The third operation is to further determine the coordinate of the virtual reality feedback device in the X-axis direction as per the principle of "a height of a triangle solved using a known area and a known length of a bottom of the triangle", after the area of the first triangle is determined.

In some embodiments, in the method above for positioning the virtual reality feedback device according to the embodiments of the disclosure, the coordinate of the virtual reality feedback device in the X-axis direction can be determined in the first, second, and third operations above in an Equation (2) of:

$$X_0 = \frac{\sqrt[2]{p(p - v_1 t_{y10})(p - v_1 t_{y20})(p - v_2 t_{y12})}}{v_2 t_{y12}}, \text{ where}$$

$$P = \frac{v_1 t_{y10} + v_1 t_{y20} + v_2 t_{y12}}{2}.$$

Where $v_1$ represents the transmission speed of the first microwave signal, $v_2$ represents the transmission speed of the second microwave signal, $t_{y12}$ represents a difference in time between a reception time point and a transmission time point of the second microwave signal corresponding to two sub-detectors at the same coordinate in the Z-axis direction as the virtual reality feedback device, in the position detection devices arranged along the Y-axis direction; and $t_{y10}$ and $t_{y20}$ represent differences in time between reception time points and transmission time points of the first microwave signal corresponding to the two sub-detectors at the same coordinate in the Z-axis direction as the virtual reality feedback device, in the position detection devices arranged along the Y-axis direction.

In some embodiments, in the method above for positioning the virtual reality feedback device according to the embodiments of the disclosure, determining the coordinate of the virtual reality feedback device in the Y-axis direction according to the obtained first time point information of the first microwave signal corresponding to the position detection devices arranged along the X-axis direction, the obtained second time point information of the second microwave signal corresponding to the position detection devices arranged along the X-axis direction, the transmission speed of the first microwave signal and the transmission speed of the second microwave signal includes: determining distances between the virtual reality feedback device, and such sub-detectors in the position detection devices arranged along the X-axis direction that have same coordinate in the Z-axis direction as the virtual reality feedback device, according to obtained first time point information of the first microwave signal corresponding to the sub-detectors, and the transmission speed of the first microwave signal; determining a distance between the sub-detectors in the position detection devices arranged along the X-axis direction that have the same coordinate in the Z-axis direction as the virtual reality feedback device, according to obtained second time point information of the second microwave signal corresponding to the sub-detectors, and the transmission speed of the second microwave signal; and determining the coordinate of the virtual reality feedback device in the Y-axis direction according to the distances between the virtual reality feedback device and the sub-detectors, and the distance between the sub-detectors.

In the embodiments of the disclosure, the coordinate of the virtual reality feedback device in the Y-axis direction is determined as follows: an area of a triangle defined by the virtual reality feedback device, and two adjacent position detection devices arranged along the X-axis direction is calculated in the Helen equation of a triangle, and then the coordinate of the virtual reality feedback device in the Y-axis direction is determined as per the principle of "a height of a triangle solved using a known area and a known length of a bottom of the triangle".

Figure 5:
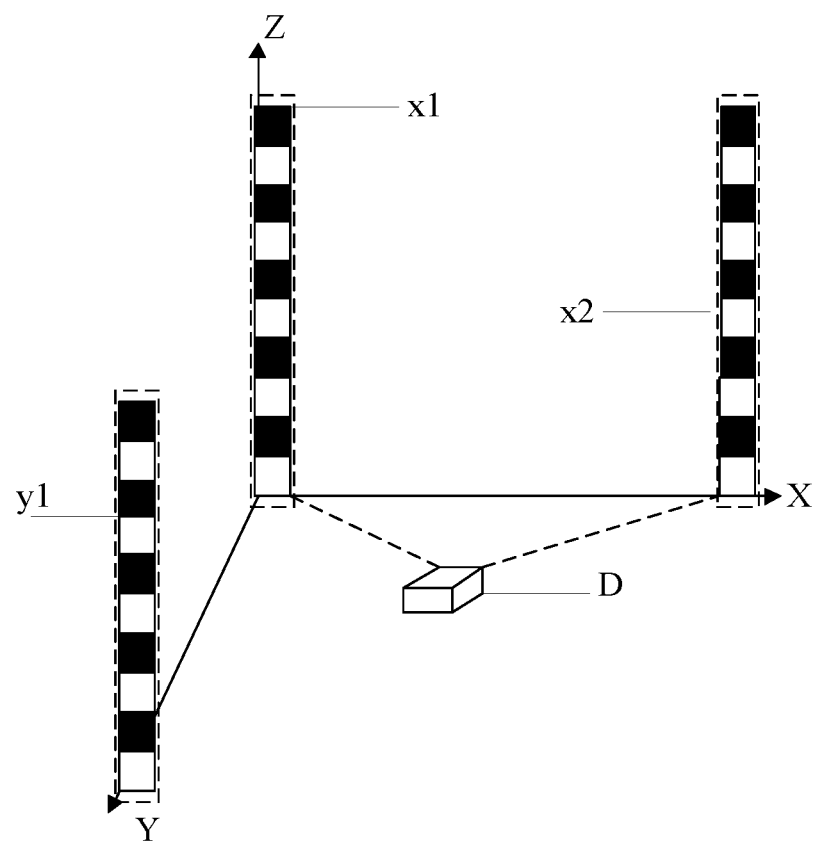
FIG. 5 is a schematic structural diagram of determining by a virtual reality feedback device a coordinate position in a Y-axis direction in a coordinate system consisted of position detection devices according to the embodiments of the disclosure.

In some embodiments, if there are only three position detection devices, then the virtual reality feedback device D may be located in a coordinate system consisted of the three position detection devices as illustrated in FIG. 5, where the first position detection device y1 and the third position detection device x1 are arranged along the Y-axis direction, and the third position detection device x1 and a fourth position detection device x2 are arranged along the X-axis direction. And in order to determine the position of the virtual reality feedback device in the coordinate system more conveniently, the origin of the coordinate system can be set at will, and of course, the position of the virtual reality feedback device can be determined more easily if any position detection device is located at the origin, for example, the third position detection device x1 or the fourth position detection device x2 can be positioned at the origin of the coordinate system, where FIG. 5 merely illustrates the third position detection device x1 being positioned at the origin of the coordinate system by way of an example.

In order to further determine the coordinate of the virtual reality feedback device D in the Y-axis direction, a second triangle defined by the virtual reality feedback device D, the third position detection device x1 and the fourth position detection device x2 can be used.

In the first operation, lengths of respective sides in the second triangle are determined respectively. Where firstly a distance between the virtual reality feedback device D and the third position detection device x1 is determined as a product of a length of time for the first microwave signal to be transmitted between the virtual reality feedback device D and the third position detection device x1, and the transmission speed of the first microwave signal; for example, the transmission speed of the first microwave signal is $v_1$, and the length of time for the first microwave signal to be transmitted from the virtual reality feedback device D to the third position detection device x1 is $t_{x10}=t_{x1}-t_0$, where $t_0$ represents the transmission time point of the first microwave signal, and $t_{x1}$ represents the reception time point of the first microwave signal, or the length of time for the first microwave signal to be transmitted from the third position detection device x1 to the virtual reality feedback device D is $t_{x10}=t_0-t_{x1}$, where $t_0$ represents the reception time point of the first microwave signal, and $t_{x1}$ represents the transmission time point of the first microwave signal. Then alike, a distance between the virtual reality feedback device D and the fourth position detection device x2 is determined as a product of a length of time for the first microwave signal to be transmitted between the virtual reality feedback device D and the fourth position detection device x2, and the transmission speed of the first microwave signal; for example, the transmission speed of the first microwave signal is $v_1$, and the length of time for the first microwave signal to be transmitted from the virtual reality feedback device D to the fourth position detection device x2 is $t_{x20}=t_{x2}-t_0$, where $t_0$ represents the transmission time point of the first microwave signal, and $t_{x2}$ represents the reception time point of the first microwave signal, or the length of time for the first microwave signal to be transmitted from the fourth position detection device x2 to the virtual reality feedback device D is $t_{x20}=t_0-t_{x2}$, where $t_0$ represents the reception time point of the first microwave signal, and $t_{x2}$ represents the transmission time point of the first microwave signal. Next, a distance between the third position detection device x1 and the fourth position detection device x2 is determined as a product of a length of time for the second microwave signal to be transmitted between the third position detection device x1 and the fourth position detection device x2, and the transmission speed of the second microwave signal; for example, the transmission speed of the second microwave signal is $v_2$, and the length of time for the second microwave signal to be transmitted from the third position detection device x1 to the fourth position detection device x2 (or from the fourth position detection device x2 to the third position detection device x1) is $t_{x12}=t_{x1}-t_{x2}$, where $t_{x2}$ represents the transmission time point of the second microwave signal, and $t_{x1}$ represents the reception time point of the second microwave signal.

The second operation is to calculate an area of the second triangle in Equation (1) above. In some embodiments, the distance between the virtual reality feedback device D and the third position detection device x1, the distance between the virtual reality feedback device D and the fourth position detection device x2, and the distance between the third position detection device x1 and the fourth position detection device x2 in the second triangle determined in the first operation are substituted respectively into Equation (1) to calculate the area of the second triangle.

The third operation is to further determine the coordinate of the virtual reality feedback device in the Y-axis direction as per the principle of "a height of a triangle solved using a known area and a known length of a bottom of the triangle", after the area of the second triangle is determined.

In some embodiments, in the method above for positioning the virtual reality feedback device according to the embodiments of the disclosure, the coordinate of the virtual reality feedback device in the Y-axis direction can be determined in the first, second, and third operations above in an Equation (3) of:

$$Y_0 = \frac{\sqrt[2]{q(q-v_1 t_{x10})(q-v_1 t_{x20})(q-v_2 t_{x12})}}{v_2 t_{x12}}, \text{ where}$$

$$P = \frac{v_1 t_{x10} + v_1 t_{x20} + v_2 t_{x12}}{2}.$$

Where $v_1$ represents the transmission speed of the first microwave signal, $v_2$ represents the transmission speed of the second microwave signal, $t_{x12}$ represents a difference in time between a reception time point and a transmission time point of the second microwave signal corresponding to two sub-detectors at the same coordinate in the Z-axis direction as the virtual reality feedback device, in the position detection devices arranged along the X-axis direction; and $t_{x10}$ and $t_{x20}$ represent differences in time between reception time points and transmission time points of the first microwave signal corresponding to the two sub-detectors at the same coordinate in the Z-axis direction as the virtual reality feedback device, in the position detection devices arranged along the X-axis direction.

It shall be noted that when the origin of the coordinate system defined by the position detection devices is positioned differently, the coordinate of the virtual reality feedback device on the X axis or the Y axis can be determined in a different equation. As illustrated in FIG. 5, for example, if the origin is the position of the first position detection device, then the coordinate of the virtual reality feedback device in the Y-axis direction may be determined in an Equation (4) of:

$$Y_0 = v_2 t_{y12} - \frac{\sqrt[2]{q(q-v_1 t_{x10})(q-v_1 t_{x20})(q-v_2 t_{x12})}}{v_2 t_{x12}}, \text{ where}$$

$$P = \frac{v_1 t_{x10} + v_1 t_{x20} + v_2 t_{x12}}{2}.$$

Where $v_1$ represents the transmission speed of the first microwave signal, $v_2$ represents the transmission speed of the second microwave signal, $t_{y12}$ represents a difference in time between a reception time point and a transmission time point of the second microwave signal corresponding to two sub-detectors at the same coordinate in the Z-axis direction as the virtual reality feedback device, in the position detection devices arranged along the Y-axis direction; $t_{x12}$ represents a difference in time between a reception time point and a transmission time point of the second microwave signal corresponding to two sub-detectors at the same coordinate in the Z-axis direction as the virtual reality feedback device, in the position detection devices arranged along the X-axis direction; and $t_{x10}$ and $t_{x20}$ represent differences in time between reception time points and transmission time points of the first microwave signal corresponding to the two sub-detectors at the same coordinate in the Z-axis direction as the virtual reality feedback device, in the position detection devices arranged along the X-axis direction.

It shall be noted that the position of the virtual reality feedback device has been determined using only three position detection devices as described in the embodiments above by way of an example, but the embodiments of the disclosure will not be limited to the three position detection devices, and the position of the virtual reality feedback device can be determined using four or more position detection devices. In some embodiments, in order to calculate the coordinate position of the virtual reality feedback device conveniently, the position thereof is preferably determined using position detection devices distributed regularly in two directions perpendicular to each other.

In some embodiments, in the method above for positioning the virtual reality feedback device according to the embodiments of the disclosure, a microwave signal includes an identifier for identifying such a sub-detector in a position detection device that transmits the microwave signal. In some embodiments, each position detection device transmits and receives a second microwave signal, in order to further determine which position detection device has transmitted the second microwave signal received by another position detection device, each second microwave signal carries an identifier of the position detection device transmitting the second microwave signal; and if the position detection device transmitting the second microwave signal further includes a plurality of sub-detectors, then the second microwave signal will further carry an identifier of a sub-detector transmitting the second microwave signal. For example, if the second microwave signal is transmitted by the first sub-detector in the position detection device, then the second microwave signal will carry an identifier identifying the position detection device and the first sub-detector. Since the position detection device transmits or receives the first microwave signal, in order to further determine which position detection device has transmitted the first microwave signal, each first microwave signal carries an identifier of the position detection device transmitting the first microwave signal, and if the position detection device transmitting the first microwave signal further includes a plurality of sub-detectors, then the first microwave signal will further carry an identifier of a sub-detector transmitting the first microwave signal. For example, if the first microwave signal is transmitted by the first sub-detector in the position detection device, then the first microwave signal will carry an identifier identifying the position detection device and the first sub-detector. Furthermore either the position detection device or the virtual reality feedback device receiving the first microwave signal or the second microwave signal can determine which sub-detector in which position detection device has transmitted the microwave signal, according to the identifier in the first microwave signal, or the identifier in the second microwave signal.

It shall be noted that, the identifier in the embodiments of the disclosure can be a number, a letter, or any other appropriate identifier, although the embodiments of the disclosure will not be limited thereto.

In some embodiments, in the embodiments of the disclosure, in order to further determine a position of a moving virtual reality feedback device, positions of the virtual reality feedback device in the coordinate system at different instances of time are determined, and a displacement of the virtual reality feedback device is further determined according to the positions of the virtual reality feedback device at the different instances of time.

In some embodiments, the coordinates of the virtual reality feedback device in the X-axis and Y-axis directions can be determined in real time in Equations (1), (2), and (3) above, and the coordinate of the virtual reality feedback device in the Z-axis direction can be determined according to the first time point information of the first microwave signal, so that the position of the virtual reality feedback device in the space can be determined. In order to further track the virtual reality feedback device, the coordinates of the virtual reality feedback device in the X-axis, Y-axis, and Z-axis directions can be determined periodically, and the distance over which the virtual reality feedback device moves in the space can be further determined.

Figure 6:
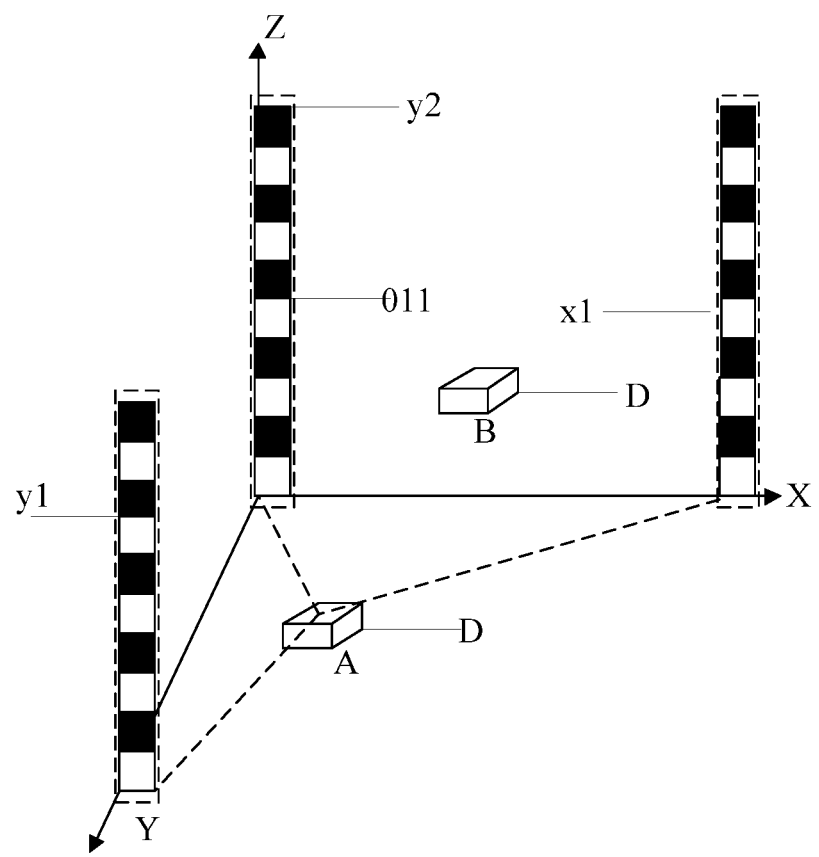
FIG. 6 is a schematic structural diagram of a movement track of a virtual reality feedback device in a coordinate system consisted of position detection devices according to the embodiments of the disclosure.

As illustrated in FIG. 6, the virtual reality feedback device moves from a point A to a point B, where the coordinate position of the virtual reality feedback device at the point A can be determined according to a triangle defined by the virtual reality feedback device at the point A, the first position detection device y1 and the second position detection device y2, and a triangle defined by the virtual reality feedback device at the point A, the third position detection device x1 and the second position detection device y2. And the coordinate position of the virtual reality feedback device at the point B can be determined according to a triangle defined by the virtual reality feedback device at the point B, the first position detection device y1 and the second position detection device y2, and a triangle defined by the virtual reality feedback device at the point B, the third position detection device x1 and the second position detection device y2. After the respective positions of the point A and the point B in the space are determined, a distance over which the virtual reality feedback device moves from the point A to the point B is determined in an equation of calculating a distance between two points.

It shall be noted that the method for positioning the virtual reality feedback device according to the embodiments of the disclosure can be applicable to different scenarios, and can be embedded into any device, and performed simply and conveniently; and the solution according to the embodiments of the disclosure not only can track the position of the virtual reality feedback device in a plane, but also can track the position of the virtual reality feedback device in a space. For example, a position of a user shall be captured in real time in a game system or an educational system.

Figure 7:
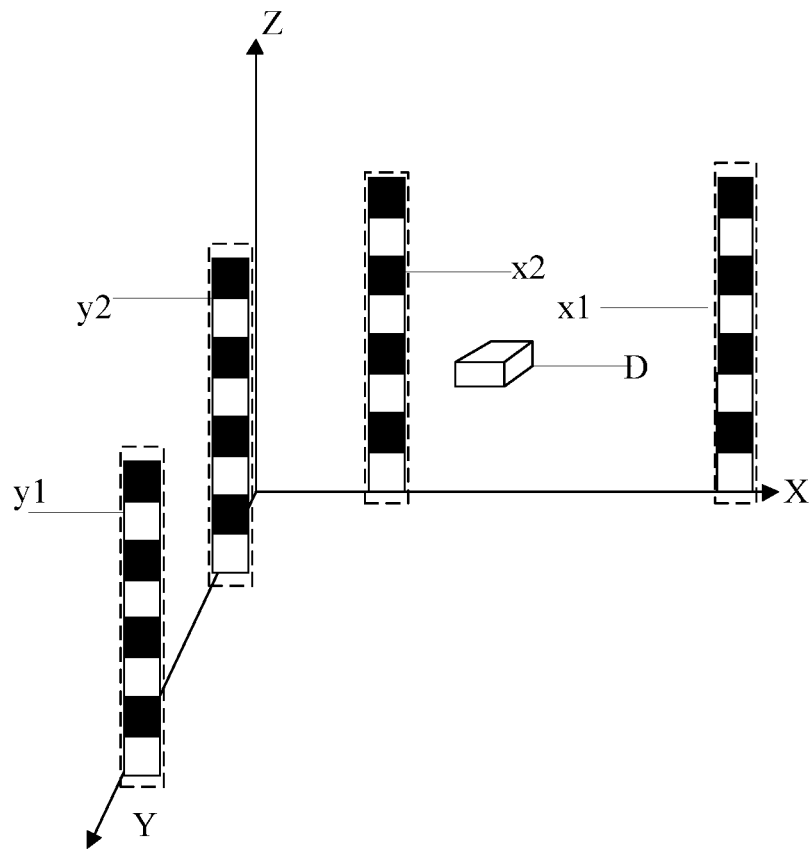
FIG. 7 is a schematic structural diagram of a distribution of position detection devices according to the embodiments of the disclosure.

Detailed operations in the method for positioning the virtual reality feedback device according to the embodiments of the disclosure will be described below in details in connection with a particular embodiment thereof, where the virtual reality feedback device is positioned using the position detection devices as illustrated in FIG. 7. Here the first position detection device y1 and the second position detection device y2 are arranged along the Y-axis direction, and the third position detection device x1 and the fourth position detection device x2 are arranged along the X-axis direction, where each position detection device includes three sub-detectors. The position detection devices transmit second microwave signals periodically, and the virtual reality feedback device transmits a first microwave signal periodically.

In the first operation, a plurality of sub-detectors in the first position detection device y1, the second position detection device y2, the third position detection device x1 and the fourth position detection device x2 receive the first microwave signal transmitted by the virtual reality feedback device D.

In the second operation, a smallest one of differences in time point between transmission time points and reception time points of the first microwave signal received by the plurality of sub-detectors is determined according to the transmission time points and the reception time points of the first microwave signal, and a coordinate of a sub-detector corresponding to the smallest one of the differences in time point is determined as the coordinate of the virtual reality feedback device in the Z-axis direction.

For example, of three sub-detectors in the first position detection device y1, a first sub-detector receives the first microwave signal transmitted at the same instance of time, at a time point, time1, a second sub-detector receives the first microwave signal at a time point, time2, and a third sub-detector receives the first microwave signal at a time point, time3, where the first microwave signal is transmitted at a time point, T1, so the differences in time point between the reception time points and the transmission time points are determined respectively as time1−T1, time2−T1, and time3−T1, and if it is determined that a value of time2−T1 is the smallest, then it will be determined that the second sub-detector is the nearest from the virtual reality feedback device, so the coordinate of the virtual reality feedback device in the Z-axis direction is determined as the coordinate of the second sub-detector in the Z-axis direction.

In the third operation, of four sub-detectors at the same coordinate on the Z-axis as the virtual reality feedback device, a length of time for the first microwave signal to be transmitted to the second sub-detector in the first position detection device y1 is determined according to a reception time point when the second sub-detector in the first position detection device y1 receives the first microwave signal; a length of time for the first microwave signal to be transmitted to a second sub-detector in the second position detection device y2 is determined according to a reception time point when the second sub-detector in the second position detection device y2 receives the first microwave signal; and the coordinate of the virtual reality feedback device in the X-axis direction is determined according to a length of time for the second microwave signal to be transmitted between the second sub-detector in the first position detection device y1, and the second sub-detector in the second position detection device y2.

In the fourth operation, of the four sub-detectors at the same coordinate on the Z-axis as the virtual reality feedback device, a length of time for the first microwave signal to be transmitted to a second sub-detector in the third position detection device x1 is determined according to a reception of time when the second sub-detector in the third position detection device x1 receives the first microwave signal; a length of time for the first microwave signal to be transmitted to a second sub-detector in the fourth position detection device x2 is determined according to a reception of time when the second sub-detector in the fourth position detection device x2 receives the first microwave signal; and the coordinate of the virtual reality feedback device in the Y-axis direction is determined according to a length of time for the second microwave signal to be transmitted between the second sub-detector in the fourth position detection device x2, and the second sub-detector in the third position detection device x1.

In the fifth operation, positions of the virtual reality feedback device at different instances of time are determined as described in the first to fourth operations above.

In the sixth operation, a displacement of the virtual reality feedback device in a period of time including the different instances of time is determined according to the positions of the virtual reality feedback device determined at the different instances of time.

It shall be noted that the position of the virtual reality feedback device in a real space is determined in the method above for positioning the virtual reality feedback device according to the embodiments of the disclosure, and in order to further feed back information according to the position of the virtual reality feedback device in the real space, the embodiments of the disclosure further provide a feedback method of the virtual reality feedback device.

Figure 8:
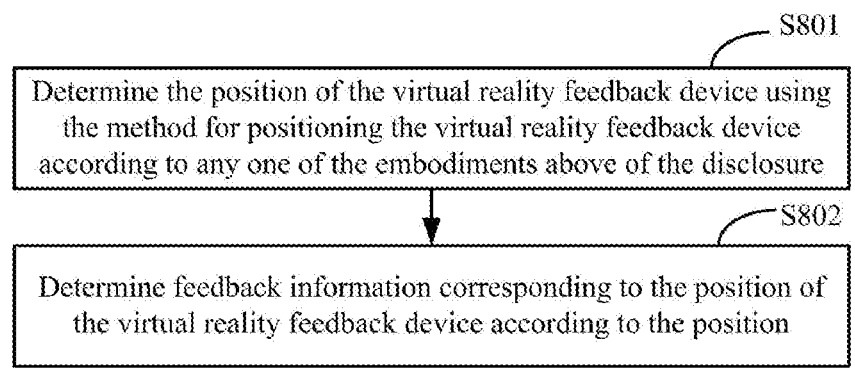
FIG. 8 is a schematic flow chart of a feedback method of a virtual reality feedback device according to the embodiments of the disclosure.

Based upon the same inventive concept, as illustrated in FIG. 8, the embodiments of the disclosure further provide a feedback method of the virtual reality feedback device, where the method includes the following operations.

The operation S801 is to determine the position of the virtual reality feedback device using the method for positioning the virtual reality feedback device according to any one of the embodiments above of the disclosure.

In some embodiments, the position of the virtual reality feedback device can be determined in the operation S801 as described in the embodiments above, so a repeated description thereof will be omitted here; and the position of the virtual reality feedback device determined in the operation S801 is the position of the virtual reality feedback device in a real space.

The operation S802 is to determine feedback information corresponding to the position of the virtual reality feedback device according to the position.

In the embodiments of the disclosure, the feedback information includes displayed image information, audible information, action information, virtual positional information, etc., although the embodiments of the disclosure will not be limited thereto.

For example, in a game system, a virtual position of a user in a virtual environment shall be further determined according to a position of the user determined in real time, and an environment at that position, and an action to be performed by the user at the virtual position shall be indicated. For example, the virtual position corresponding to the real position is countryside or a city in the game system, and the user needs to throw his or her punch, to squat, or perform another action at the virtual position.

For example, in a room escape system in the game system, firstly a real position and a movement vector of the virtual reality feedback device in a real space are determined as described in the embodiments above; then the room escape system obtains the real position and the movement vector of the virtual reality feedback device in the real space, where the virtual reality feedback device moves from the point A to the point B, for example; the room escape system determines a virtual position and a variation of the virtual position of the virtual reality feedback device in the room escape virtual system, according to the real position and the movement vector of the virtual reality feedback device in the real space, where the virtual reality feedback device moves from a left side of a door of a room to a right side of the door, stands up, or squats down, for example; and finally an image to be displayed on or an action to be performed by the virtual reality feedback device is determined according to the virtual position and the variation of the virtual position of the virtual reality feedback device in the room escape virtual system.

For example, in an educational system of a virtual zoo, firstly a real position and a movement vector of the virtual reality feedback device in a real space are determined as described in the embodiments above; then the educational system obtains the real position and the movement vector of the virtual reality feedback device in the real space, where the virtual reality feedback device moves from the point A to the point B, for example; the educational system determines a virtual position and a variation of the virtual position of the virtual reality feedback device in the educational system, according to the real position and the movement vector of the virtual reality feedback device in the real space, where the virtual reality feedback device moves from a cage of a lion to a cage of a tiger, stands up, or squats down, for example; and finally an image to be displayed on or an action to be performed by the virtual reality feedback device is determined according to the virtual position and the variation of the virtual position of the virtual reality feedback device in the educational system.

In some embodiments, in the method above for positioning the virtual reality feedback device according to the embodiments of the disclosure, the virtual reality feedback device is a wearable display device, and determining the feedback information corresponding to the position of the virtual reality feedback device according to the position includes: determining coordinates of the wearable display device in a corresponding virtual reality environment according to positional information of the wearable display device; and determining a corresponding image to be displayed on the wearable display device according to the coordinates of the wearable display device in the corresponding virtual reality environment.

In some embodiments, when the coordinates of the wearable display device in the corresponding virtual reality environment are determined according to the positional information of the wearable display device in the real space, the coordinates can be determined according to a one-to-one correspondence relationship between positional information and coordinates in the virtual reality environment, where the one-to-one correspondence relationship between positional information and coordinates in the virtual reality environment can be preset. The corresponding image to be displayed on the wearable display device varies with the varying coordinates of the wearable display device in the corresponding virtual reality environment.

In some embodiments, when the virtual reality feedback device is a wearable display device, after the real position of the wearable display device is determined, in order to enable the wearable display device to operate precisely, a rotation angle of the wearable display device is further determined, where the rotation angle of the wearable display device can be determined using a gravity sensor or a gyro sensor or otherwise; and the corresponding image to be displayed on the wearable display device can be further determined according to the rotation angle of the wearable display device, where images corresponding to different rotation angles may be different, for example, if there are different corresponding viewing angles of the wearable display device at different rotation angles at the same coordinates in the virtual reality environment (for example, the wearable display device is oriented northward or southward), then different images will be displayed.

It shall be noted that, the feedback method of the virtual reality feedback device according to the embodiments of the disclosure can be applicable to different scenarios, and can be embedded into any device, and is performed simply and conveniently; and the solution according to the embodiments of the disclosure can determine information to be fed back, according to the position of the virtual reality feedback device on a plane or in a space.

Figure 9:
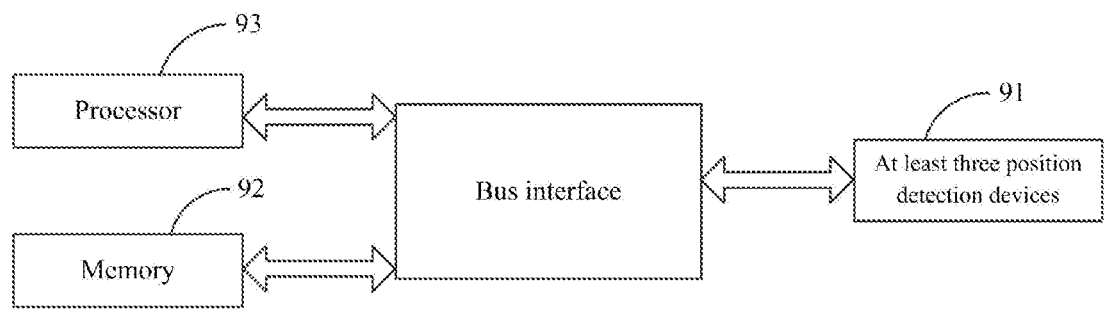
FIG. 9 is a schematic structural diagram of a system for positioning a virtual reality feedback device according to the embodiments of the disclosure.

Based upon the same inventive concept, referring to FIG. 9, the embodiments of the disclosure further provide a system for positioning the virtual reality feedback device, where the system includes following components.

At least three position detection devices 91, configured to transmit a first microwave signal and/or to receive a first microwave signal, and to transmit and receive a second microwave signal, where at least two adjacent position detection devices of the at least three position detection devices are arranged along an X-axis direction, and at least two adjacent position detection devices of the at least three position detection devices are arranged along a Y-axis direction; and an X-axis is perpendicular to a Y-axis.

A memory 92, configured to store computer readable program codes; and a processor 93, configured to execute the computer readable program codes to: obtain first time point information of the first microwave signal; where the first time point information includes a reception time point of the first microwave signal and a transmission time point of the first microwave signal, the first microwave signal is a microwave signal transmitted by the virtual reality feedback device and received by the at least three position detection devices, or the first microwave signal is a microwave signal transmitted by the at least three position detection devices and received by the virtual reality feedback device; obtain second time point information of the second microwave signal, where the second time point information includes a reception time point of the second microwave signal and a transmission time point of the second microwave signal, the second microwave signal is a microwave signal transmitted and received by the at least three position detection devices, and a position detection device transmitting the second microwave signal is different from a position detection device receiving the second microwave signal; and determine a position of the virtual reality feedback device according to a transmission speed of the first microwave signal, a transmission speed of the second microwave signal, the first time point information and the second time point information.

In some embodiments, in the system above for positioning the virtual reality feedback device according to the embodiments of the disclosure, each of the at least three position detection devices extends along a Z-axis direction and includes a plurality of sub-detectors arranged along the Z-axis direction, and each of the at least three position detection devices transmits the first microwave signal and/or the second microwave signal using the plurality of sub-detectors, wherein a Z-axis is perpendicular respectively to the X-axis and the Y-axis.

In some embodiments, in the system above for positioning the virtual reality feedback device according to the embodiments of the disclosure, the first microwave signal includes a microwave signal received or transmitted by a plurality of sub-detectors in any one of the at least three position detection devices; the processor is configured to determine the position of the virtual reality feedback device according to the transmission speed of the first microwave signal, the transmission speed of the second microwave signal, the first time point information and the second time point information by: determining a coordinate of the virtual reality feedback device in the Z-axis direction according to the first time point information; determining a coordinate of the virtual reality feedback device in the X-axis direction according to obtained first time point information of the first microwave signal corresponding to position detection devices arranged along the Y-axis direction, obtained second time point information of the second microwave signal corresponding to the position detection devices arranged along the Y-axis direction, the transmission speed of the first microwave signal and the transmission speed of the second microwave signal; and determining a coordinate of the virtual reality feedback device in the Y-axis direction according to obtained first time point information of the first microwave signal corresponding to position detection devices arranged along the X-axis direction, obtained second time point information of the second microwave signal corresponding to the position detection devices arranged along the X-axis direction, the transmission speed of the first microwave signal and the transmission speed of the second microwave signal.

In some embodiments, in the system above for positioning the virtual reality feedback device according to the embodiments of the disclosure, the processor is configured to determine the coordinate of the virtual reality feedback device in the Z-axis direction according to the first time point information by: determining differences in time point between reception time points and transmission time points, corresponding to respective sub-detectors in any one of the at least three position detection device according to obtained reception time points and transmission time points of the first microwave signal, corresponding to the respective sub-detectors; determining a sub-detector corresponding to a smallest one of the differences in time point; and determining a coordinate of the sub-detector corresponding to the smallest one of the differences in time point in the Z-axis direction as the coordinate of the virtual reality feedback device in the Z-axis direction.

In some embodiments, in the system above for positioning the virtual reality feedback device according to the embodiments of the disclosure, the processor is configured to determine the coordinate of the virtual reality feedback device in the X-axis direction according to the obtained first time point information of the first microwave signal corresponding to the position detection devices arranged along the Y-axis direction, the obtained second time point information of the second microwave signal corresponding to the position detection devices arranged along the Y-axis direction, the transmission speed of the first microwave signal and the transmission speed of the second microwave signal by: determining distances between the virtual reality feedback device, and such sub-detectors in the position detection devices arranged along the Y-axis direction that have same coordinate in the Z-axis direction as the virtual reality feedback device, according to obtained first time point information of the first microwave signal corresponding to the sub-detectors, and the transmission speed of the first microwave signal; determining a distance between the sub-detectors in the position detection devices arranged along the Y-axis direction that have the same coordinate in the Z-axis direction as the virtual reality feedback device, according to obtained second time point information of the second microwave signal corresponding to the sub-detectors, and the transmission speed of the second microwave signal; and determining the coordinate of the virtual reality feedback device in the X-axis direction according to the distances between the virtual reality feedback device and the sub-detectors, and the distance between the sub-detectors.

In some embodiments, in the system above for positioning the virtual reality feedback device according to the embodiments of the disclosure, the coordinate of the virtual reality feedback device in the X-axis direction is determined in an equation of:

$$X_0 = \frac{\sqrt[2]{p(p - v_1 t_{y10})(p - v_1 t_{y20})(p - v_2 t_{y12})}}{v_2 t_{y12}}, \text{where}$$

$$P = \frac{v_1 t_{y10} + v_1 t_{y20} + v_2 t_{y12}}{2}.$$

Where $v_1$ represents the transmission speed of the first microwave signal, $v_2$ represents the transmission speed of the second microwave signal, $t_{y12}$ represents a difference in time between a reception time point and a transmission time point of the second microwave signal corresponding to two sub-detectors at the same coordinate in the Z-axis direction as the virtual reality feedback device, in the position detection devices arranged along the Y-axis direction; and $t_{y10}$ and $t_{y20}$ represent differences in time between reception time points and transmission time points of the first microwave signal corresponding to the two sub-detectors at the same coordinate in the Z-axis direction as the virtual reality feedback device, in the position detection devices arranged along the Y-axis direction.

In some embodiments, in the system above for positioning the virtual reality feedback device according to the embodiments of the disclosure, the processor is configured to determine the coordinate of the virtual reality feedback device in the Y-axis direction according to the obtained first time point information of the first microwave signal corresponding to the position detection devices arranged along the X-axis direction, the obtained second time point information of the second microwave signal corresponding to the position detection devices arranged along the X-axis direction, the transmission speed of the first microwave signal and the transmission speed of the second microwave signal by: determining distances between the virtual reality feedback device, and such sub-detectors in the position detection devices arranged along the X-axis direction that have same coordinate in the Z-axis direction as the virtual reality feedback device, according to obtained first time point information of the first microwave signal corresponding to the sub-detectors, and the transmission speed of the first microwave signal; determining a distance between the sub-detectors in the position detection devices arranged along the X-axis direction that have the same coordinate in the Z-axis direction as the virtual reality feedback device, according to obtained second time point information of the second microwave signal corresponding to the sub-detectors, and the transmission speed of the second microwave signal; and determining the coordinate of the virtual reality feedback device in the Y-axis direction according to the distances between the virtual reality feedback device and the sub-detectors, and the distance between the sub-detectors.

In some embodiments, in the system above for positioning the virtual reality feedback device according to the embodiments of the disclosure, the coordinate of the virtual reality feedback device in the Y-axis direction is determined in an equation of:

$$Y_0 = \frac{\sqrt[2]{q(q - v_1 t_{x10})(q - v_1 t_{x20})(q - v_2 t_{x12})}}{v_2 t_{x12}}, \text{where}$$

$$P = \frac{v_1 t_{x10} + v_1 t_{x20} + v_2 t_{x12}}{2}.$$

Where $v_1$ represents the transmission speed of the first microwave signal, $v_2$ represents the transmission speed of the second microwave signal, $t_{x12}$ represents a difference in time between a reception time point and a transmission time point of the second microwave signal corresponding to two sub-detectors at the same coordinate in the Z-axis direction as the virtual reality feedback device, in the position detection devices arranged along the X-axis direction; and $t_{x10}$ and $t_{x20}$ represent differences in time between reception time points and transmission time points of the first microwave signal corresponding to the two sub-detectors at the same coordinate in the Z-axis direction as the virtual reality feedback device, in the position detection devices arranged along the X-axis direction.

In some embodiments, in the system above for positioning the virtual reality feedback device according to the embodiments of the disclosure, the microwave signal includes an identifier for identifying such a sub-detector in a position detection device that transmits the microwave signal.

In some embodiments, in the system above for positioning the virtual reality feedback device according to the embodiments of the disclosure, after the position of the virtual reality feedback device is determined, the processor is further configured to: determine positions of the virtual reality feedback device at different instances of time; and determine a displacement of the virtual reality feedback device according to the positions of the virtual reality feedback device at the different instances of time.

Here in FIG. 9, the bus architecture can include any number of interconnecting buses and bridges particularly linking together various circuits including one or more processors represented by the processor 93, and one or more memories represented by the memory 92. The bus architecture can further link together various other circuits, e.g., a peripheral device, a manostat, a power management circuit, etc., all of which are known in the art, so a repeated description thereof will be omitted here. The bus interface serves as an interface. The processor 93 is responsible for managing the bus architecture and normal processes, and the memory 92 stores data to be used by the processor 93 while performing the operations.

It shall be noted that the memory and the processor in the embodiments of the disclosure can be located in the system for positioning the virtual reality feedback device, or can be located in the virtual reality feedback device, although the embodiments of the disclosure will not be limited thereto.

Based upon the same inventive concept, the embodiments of the disclosure further provide another virtual reality feedback device configured to feed back information using the feedback method above of the virtual reality feedback device according to the embodiments of the disclosure, based upon the position of the virtual reality feedback device.

In summary, in the method for positioning the virtual reality feedback device according to the embodiments of the disclosure, the first time point information of the first microwave signal, the second time point information of the second microwave signal, the transmission speed of the first microwave signal and the transmission speed of the second microwave signal are obtained, so that the position of the virtual reality feedback device is determined. In some embodiments, in the method above for positioning the virtual reality feedback device according to the embodiments of the disclosure, the method is generally applicable in such a way that the position of the virtual reality feedback device is determined according to a reception time point and a transmission time point of the second microwave signal transmitted between at least two adjacent position detection devices arranged along the Y-axis direction, a reception time point and a transmission time point of the second microwave signal transmitted between at least two adjacent position detection devices arranged along the X-axis direction, and a reception time point and a transmission time point of the first microwave signal transmitted between the virtual reality feedback device and at least three position detection devices, in a coordinate system consisted of the at least three position detection devices, so that the virtual reality feedback device can be tracked using the position detection devices through microwave transmission to thereby improve the experience of a user to some extent.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A method for positioning a virtual reality feedback device, the method comprising:
    obtaining first time point information of a first microwave signal; wherein the first time point information comprises a reception time point of the first microwave signal and a transmission time point of the first microwave signal; the first microwave signal is a microwave signal transmitted by the virtual reality feedback device and received by at least three position detection devices, or the first microwave signal is a microwave signal transmitted by at least three position detection devices and received by the virtual reality feedback device;
    obtaining second time point information of a second microwave signal; wherein the second time point information comprises a reception time point of the second microwave signal and a transmission time point of the second microwave signal; the second microwave signal is a microwave signal transmitted and received by the at least three position detection devices, and the second microwave signal transmitted by any one of the at least three position detection devices is received by position detection devices, among the at least three position detection devices, other than the any one position detection device; and
    determining a position of the virtual reality feedback device according to a transmission speed of the first microwave signal, a transmission speed of the second microwave signal, the first time point information and the second time point information;
    wherein at least two adjacent position detection devices of the at least three position detection devices are arranged along an X-axis direction, and at least two adjacent position detection devices of the at least three position detection devices are arranged along a Y-axis direction; and an X-axis is perpendicular to a Y-axis;
    each of the at least three position detection devices extends along a Z-axis direction and comprises a plurality of sub-detectors arranged along the Z-axis direction, and each of the at least three position detection devices transmits the first microwave signal and/or the second microwave signal using the plurality of sub-detectors, wherein a Z-axis is perpendicular respectively to the X-axis and the Y-axis;
    the first microwave signal comprises a microwave signal received or transmitted by a plurality of sub-detectors in any one of the at least three position detection devices; and
    said determining the position of the virtual reality feedback device according to the transmission speed of the first microwave signal, the transmission speed of the second microwave signal, the first time point information and the second time point information comprises:
        determining a coordinate of the virtual reality feedback device in the Z-axis direction according to the first time point information;
        determining a coordinate of the virtual reality feedback device in the X-axis direction according to obtained first time point information of the first microwave signal corresponding to position detection devices arranged along the Y-axis direction, obtained second time point information of the second microwave signal corresponding to the position detection devices arranged along the Y-axis direction, the transmission speed of the first microwave signal and the transmission speed of the second microwave signal; and
        determining a coordinate of the virtual reality feedback device in the Y-axis direction according to obtained first time point information of the first microwave signal corresponding to position detection devices arranged along the X-axis direction, obtained second time point information of the second microwave signal corresponding to the position detection devices arranged along the X-axis direction, the transmission speed of the first microwave signal and the transmission speed of the second microwave signal.

2. The method according to claim 1, wherein determining the coordinate of the virtual reality feedback device in the Z-axis direction according to the first time point information comprises:
    determining differences in time point between reception time points and transmission time points, corresponding to respective sub-detectors in any one of the at least three position detection device according to obtained reception time points and transmission time points of the first microwave signal, corresponding to the respective sub-detectors;
    determining a sub-detector corresponding to a smallest one of the differences in time point; and
    determining a coordinate of the sub-detector corresponding to the smallest one of the differences in time point in the Z-axis direction as the coordinate of the virtual reality feedback device in the Z-axis direction.

3. The method according to claim 1, wherein determining the coordinate of the virtual reality feedback device in the X-axis direction according to the obtained first time point information of the first microwave signal corresponding to the position detection devices arranged along the Y-axis direction, the obtained second time point information of the second microwave signal corresponding to the position detection devices arranged along the Y-axis direction, the transmission speed of the first microwave signal and the transmission speed of the second microwave signal comprises:

determining distances between the virtual reality feedback device, and such sub-detectors in the position detection devices arranged along the Y-axis direction that have same coordinate in the Z-axis direction as the virtual reality feedback device, according to obtained first time point information of the first microwave signal corresponding to the sub-detectors, and the transmission speed of the first microwave signal;

determining a distance between the sub-detectors in the position detection devices arranged along the Y-axis direction that have the same coordinate in the Z-axis direction as the virtual reality feedback device, according to obtained second time point information of the second microwave signal corresponding to the sub-detectors, and the transmission speed of the second microwave signal; and determining the coordinate of the virtual reality feedback device in the X-axis direction according to the distances between the virtual reality feedback device and the sub-detectors, and the distance between the sub-detectors.

4. The method according to claim 3, wherein the coordinate of the virtual reality feedback device in the X-axis direction is determined in an equation of:

$$X_0 = \frac{\sqrt[2]{p(p - v_1 t_{y10})(p - v_1 t_{y20})(p - v_2 t_{y12})}}{v_2 t_{y12}}, \text{wherein}$$

$$P = \frac{v_1 t_{y10} + v_1 t_{y20} + v_2 t_{y12}}{2};$$

wherein $v_1$ represents the transmission speed of the first microwave signal, $v_2$ represents the transmission speed of the second microwave signal, $t_{y12}$ represents a difference in time between a reception time point and a transmission time point of the second microwave signal corresponding to two sub-detectors at same coordinate in the Z-axis direction as the virtual reality feedback device, in the position detection devices arranged along the Y-axis direction; and $t_{y10}$ and $t_{y20}$ represent differences in time between reception time points and transmission time points of the first microwave signal corresponding to the two sub-detectors at the same coordinate in the Z-axis direction as the virtual reality feedback device, in the position detection devices arranged along the Y-axis direction.

5. The method according to claim 1, wherein determining the coordinate of the virtual reality feedback device in the Y-axis direction according to the obtained first time point information of the first microwave signal corresponding to the position detection devices arranged along the X-axis direction, the obtained second time point information of the second microwave signal corresponding to the position detection devices arranged along the X-axis direction, the transmission speed of the first microwave signal and the transmission speed of the second microwave signal comprises:

determining distances between the virtual reality feedback device, and such sub-detectors in the position detection devices arranged along the X-axis direction that have same coordinate in the Z-axis direction as the virtual reality feedback device, according to obtained first time point information of the first microwave signal corresponding to the sub-detectors, and the transmission speed of the first microwave signal;

determining a distance between the sub-detectors in the position detection devices arranged along the X-axis direction that have the same coordinate in the Z-axis direction as the virtual reality feedback device, according to obtained second time point information of the second microwave signal corresponding to the sub-detectors, and the transmission speed of the second microwave signal; and determining the coordinate of the virtual reality feedback device in the Y-axis direction according to the distances between the virtual reality feedback device and the sub-detectors, and the distance between the sub-detectors.

6. The method according to claim 5, wherein the coordinate of the virtual reality feedback device in the Y-axis direction is determined in an equation of:

$$Y_0 = \frac{\sqrt[2]{q(q - v_1 t_{x10})(q - v_1 t_{x20})(q - v_2 t_{x12})}}{v_2 t_{x12}}, \text{wherein}$$

$$P = \frac{v_1 t_{x10} + v_1 t_{x20} + v_2 t_{x12}}{2};$$

wherein $v_1$ represents the transmission speed of the first microwave signal, $v_2$ represents the transmission speed of the second microwave signal, $t_{x12}$ represents a difference in time between a reception time point and a transmission time point of the second microwave signal corresponding to two sub-detectors at same coordinate in the Z-axis direction as the virtual reality feedback device, in the position detection devices arranged along the X-axis direction; and $t_{x10}$ and $t_{x20}$ represent differences in time between reception time points and transmission time points of the first microwave signal corresponding to the two sub-detectors at the same coordinate in the Z-axis direction as the virtual reality feedback device, in the position detection devices arranged along the X-axis direction.

7. The method according to claim 1, wherein each microwave signal comprises an identifier for identifying such a sub-detector in a position detection device that transmits the microwave signal.

8. The method according to claim 1, wherein after the position of the virtual reality feedback device is determined, the method further comprises:

determining positions of the virtual reality feedback device at different instances of time; and determining a displacement of the virtual reality feedback device according to the positions of the virtual reality feedback device at the different instances of time.

9. A feedback method of the virtual reality feedback device, the method comprising:

determining the position of the virtual reality feedback device using the method for positioning the virtual reality feedback device according to claim 1; and determining feedback information corresponding to the position of the virtual reality feedback device according to the position.

10. The feedback method according to claim 9, wherein the virtual reality feedback device is a wearable display device; and determining the feedback information corresponding to the position of the virtual reality feedback device according to the position comprises:

determining coordinates of the wearable display device in a corresponding virtual reality environment according to positional information of the wearable display device; and determining an image to be displayed on the wearable display device according to the coordinates of the wearable display device in the corresponding virtual reality environment.

11. A system for positioning a virtual reality feedback device, the system comprising:

at least three position detection devices configured to transmit and/or to receive a first microwave signal, and to transmit and receive a second microwave signal; wherein at least two adjacent position detection devices of the at least three position detection devices are arranged along an X-axis direction, and at least two adjacent position detection devices of the at least three position detection devices are arranged along a Y-axis direction; and an X-axis is perpendicular to a Y-axis;

a memory configured to store computer readable program codes; and a processor configured to execute the computer readable program codes to:

obtain first time point information of the first microwave signal; wherein the first time point information comprises a reception time point of the first microwave signal and a transmission time point of the first microwave signal; the first microwave signal is a microwave signal transmitted by the virtual reality feedback device and received by the at least three position detection devices, or the first microwave signal is a microwave signal transmitted by the at least three position detection devices and received by the virtual reality feedback device;

obtain second time point information of the second microwave signal; wherein the second time point information comprises a reception time point of the second microwave signal and a transmission time point of the second microwave signal; the second microwave signal is a microwave signal transmitted and received by the at least three position detection devices, and the second microwave signal transmitted by any one of the at least three position detection devices is received by position detection devices, among the at least three position detection devices, other than the any one position detection device; and determine a position of the virtual reality feedback device according to a transmission speed of the first microwave signal, a transmission speed of the second microwave signal, the first time point information and the second time point information;

wherein each of the at least three position detection devices extends along a Z-axis direction and comprises a plurality of sub-detectors arranged along the Z-axis direction, and each of the at least three position detection devices transmits the first microwave signal and/or the second microwave signal using the plurality of sub-detectors, wherein a Z-axis is perpendicular respectively to the X-axis and the Y-axis;

the first microwave signal comprises a microwave signal received or transmitted by a plurality of sub-detectors in any one of the at least three position detection devices; and the processor is further configured to execute the computer readable program codes to:

determine a coordinate of the virtual reality feedback device in the Z-axis direction according to the first time point information;

determine a coordinate of the virtual reality feedback device in the X-axis direction according to obtained first time point information of the first microwave signal corresponding to position detection devices arranged along the Y-axis direction, obtained second time point information of the second microwave signal corresponding to the position detection devices arranged along the Y-axis direction, the transmission speed of the first microwave signal and the transmission speed of the second microwave signal; and determine a coordinate of the virtual reality feedback device in the Y-axis direction according to obtained first time point information of the first microwave signal corresponding to position detection devices arranged along the X-axis direction, obtained second time point information of the second microwave signal corresponding to the position detection devices arranged along the X-axis direction, the transmission speed of the first microwave signal and the transmission speed of the second microwave signal.

12. The system according to claim 11, wherein the processor is further configured to execute the computer readable program codes to:

determine differences in time point between reception time points and transmission time points, corresponding to respective sub-detectors in any one of the at least three position detection device according to obtained reception time points and transmission time points of the first microwave signal, corresponding to the respective sub-detectors;

determine a sub-detector corresponding to a smallest one of the differences in time point; and determine a coordinate of the sub-detector corresponding to the smallest one of the differences in time point in the Z-axis direction as the coordinate of the virtual reality feedback device in the Z-axis direction.

13. The system according to claim 11, wherein the processor is further configured to execute the computer readable program codes to:

determine distances between the virtual reality feedback device, and such sub-detectors in the position detection devices arranged along the Y-axis direction that have same coordinate in the Z-axis direction as the virtual reality feedback device, according to obtained first time point information of the first microwave signal corresponding to the sub-detectors, and the transmission speed of the first microwave signal;

determine a distance between the sub-detectors in the position detection devices arranged along the Y-axis direction that have the same coordinate in the Z-axis direction as the virtual reality feedback device, according to obtained second time point information of the second microwave signal corresponding to the sub-detectors, and the transmission speed of the second microwave signal; and determine the coordinate of the virtual reality feedback device in the X-axis direction according to the distances between the virtual reality feedback device and the sub-detectors, and the distance between the sub-detectors.

14. The system according to claim 11, wherein the processor is further configured to execute the computer readable program codes to:
  determine distances between the virtual reality feedback device, and such sub-detectors in the position detection devices arranged along the X-axis direction that have same coordinate in the Z-axis direction as the virtual reality feedback device, according to obtained first time point information of the first microwave signal corresponding to the sub-detectors, and the transmission speed of the first microwave signal;
  determine a distance between the sub-detectors in the position detection devices arranged along the X-axis direction that have the same coordinate in the Z-axis direction as the virtual reality feedback device, according to obtained second time point information of the second microwave signal corresponding to the sub-detectors, and the transmission speed of the second microwave signal; and
  determine the coordinate of the virtual reality feedback device in the Y-axis direction according to the distances between the virtual reality feedback device and the sub-detectors, and the distance between the sub-detectors.

15. A virtual reality feedback device, wherein the virtual reality feedback device is positioned using the method for positioning the virtual reality feedback device according to claim 1.

16. A virtual reality feedback device, wherein the virtual reality feedback device performs feedback using the feedback method of the virtual reality feedback device according to claim 9, based on the position of the virtual reality feedback device.

* * * * *